United States Patent [19]

Iijima et al.

[11] Patent Number: 5,358,813
[45] Date of Patent: Oct. 25, 1994

[54] CRYSTALS OF CHLOROGALLIUM PHTHALOCYANINE AND METHOD OF PREPARING THEM

[75] Inventors: Masakazu Iijima; Katsumi Nukada; Katsumi Daimon; Akira Imai; Toru Ishii; Yasuo Sakaguchi; Kiyokazu Mashimo; Ichiro Takegawa, all of Minami-ashigara, Japan

[73] Assignee: Fuji Xerox Co., Ltd., Tokyo, Japan

[21] Appl. No.: 3,123

[22] Filed: Jan. 12, 1993

Related U.S. Application Data

[63] Continuation-in-part of Ser. No. 871,552, Apr. 21, 1992.

[30] Foreign Application Priority Data

| | | | |
|---|---|---|---|
| Jan. 13, 1902 | [JP] | Japan | 4-21682 |
| Apr. 22, 1991 | [JP] | Japan | 3-116630 |
| Jan. 20, 1992 | [JP] | Japan | 4-027449 |

[51] Int. Cl.$^5$ .............................................. G03G 5/06
[52] U.S. Cl. ............................. 430/59; 430/73; 430/78; 540/141
[58] Field of Search ............ 430/59, 58, 135, 78; 590/141

[56] References Cited

U.S. PATENT DOCUMENTS

| | | | |
|---|---|---|---|
| 2,770,029 | 11/1956 | Ueltz | 29/182 |
| 3,160,635 | 12/1964 | Knudson et al. | 260/314.5 |
| 3,357,989 | 12/1967 | Byrne et al. | 260/314.5 |
| 3,708,292 | 1/1973 | Brach et al. | 96/1.5 |
| 5,087,540 | 2/1992 | Murakami et al. | 430/135 |

FOREIGN PATENT DOCUMENTS

| | | |
|---|---|---|
| 48-34189 | 5/1973 | Japan. |
| 49-105536 | 10/1974 | Japan. |
| 50-38543 | 4/1975 | Japan. |
| 62-247374 | 10/1978 | Japan. |
| 57-148745 | 9/1982 | Japan. |
| 58-21414 | 2/1983 | Japan. |
| 59-44053 | 3/1984 | Japan. |
| 61-151659 | 7/1986 | Japan. |
| 1-221459 | 9/1989 | Japan. |

OTHER PUBLICATIONS

Tanaka et al.; "Photoconduction of Metal Phthalocyanine (III)—Rectification Properties of Gallium Phthalocyanine"; Denshishashin Gakkaishgi, vol. 26(3) (1987); pp. 240–244.

Arishima et al.; "Electrophotographic Photoreceptors with High Sensitivity in Near Infrared Region Using Phthalocyanine Compounds"; Shinkyo Gihoh CPM-8-1-69, (1981); pp. 39–45.

Zeitschrift für Anorganische und Allgemeine Chemie, 354, No. 1–2 (Sep. 1967): 1–9.

Journal of Imaging Science, 29, No. 1 (Jan./Feb. 1985): 7–10.

Primary Examiner—John Goodrow
Attorney, Agent, or Firm—Oliff & Berridge

[57] ABSTRACT

Crystals of chlorogallium phthalocyanine, having distinct diffraction peaks at (i) 7.4°, 16.6°, 25.5° and 28.3°, (ii) 6.8°, 17.3°, 23.6° and 26.9°, or (iii) 8.7° to 9.2°, 17.6°, 24.0°, 27.4° and 28.8° of the Bragg angle ($2\theta \pm 0.2$) to a CuK$\alpha$ characteristic X-ray; a photoconductive material for electrophotographic photoreceptor comprising the chlorogallium phthalocyanine; and an electrophotographic photoreceptor comprising an electroconductive support having thereon a light-sensitive layer containing at least one or more of chlorogallium phthalocyanine crystals. The electrophotographic photoreceptor has excellent sensitivity and durability.

34 Claims, 12 Drawing Sheets

CRYSTALS OF CHLOROGALLIUM PHTHALOCYANINE AND METHOD OF PREPARING THEM

CROSS REFERENCE TO RELATED APPLICATION

This application is a continuation-in-part of application Ser. No. 07/871,552 filed on Apr. 21, 1992, now pending.

FIELD OF THE INVENTION

The present invention relates to novel crystals of chlorogallium phthalocyanine and a method of preparing them. It also relates to a photoconductive material comprising the crystals and an electrophotographic photoreceptor using the photoconductive material.

BACKGROUND OF THE INVENTION

Hitherto, various light-sensitive materials for electrophotographic photoreceptors have been proposed; and for laminate type electrophotographic photoreceptors where the light-sensitive layer is composed of separate charge generating layer and charge transporting layer, various organic compounds have been proposed as charge generating materials.

Recently, the demand for extending the light-sensitive wavelength range of organic photoconductive materials which have heretofore been proposed up to the near infrared wavelength range of semiconductor lasers (780 to 830 nm) so as to use the materials as a photoreceptor for a digital recording system such as a laser printer. From the viewpoint, squarylium compounds (as disclosed, e.g., in JP-A-49-105536 and JP-A-58-21414), triphenylamine trisazo compounds (as disclosed, e.g., in JP-A-61-151659) and phthalocyanine compounds (as disclosed, e.g., in JP-A-48-34189 and JP-A-57-148745) have been proposed as photoconductive materials for semiconductor lasers. (The term "JP-A" as used herein means an "unexamined published Japanese patent application").

Where organic photoconductive materials are used as light-sensitive materials for semiconductor lasers, they are needed to satisfy the conditions that the light-sensitive wavelength range is extended up to a long wavelength range and that the sensitivity and durability of the photoreceptors to be formed therefrom are good. The above-mentioned organic photoconductive materials do not sufficiently satisfy the conditions.

In order to overcome various drawbacks of the known photoconductive materials, the materials have been investigated with respect to the relationship between the crystal form and the electrophotographic characteristics. In particular, many reports relating to phthalocyanine compounds have heretofore been disclosed.

In general, it is known that phthalocyanine compounds have various crystal forms, depending upon the difference in the manufacture method and treating method, and that the difference in the crystal form has a great influence on the photo-electric conversion characteristics of phthalocyanine compounds. Regarding crystal forms of phthalocyanine compounds, for example, with respect to copper phthalocyanine, various crystal forms of $\alpha$, $\pi$, $\chi$, $\rho$, $\gamma$ and $\delta$ are known in addition to a stable crystal form of $\beta$. It is also known that these crystal forms are mutually transferable to each other by mechanical strain force, sulfuric acid treatment, organic solvent treatment or heat treatment (for example, refer to U.S. Pat. Nos. 2,770,029, 3,160635, 3,708,292 and 3,357,989). JP-A-50-38543 describes the difference of crystal forms of copper phthalocyanine and electrophotographic characteristics of them. It mentions that e crystal forms of copper phthalocyanine have the highest sensitivity as compared with other $\alpha$, $\beta$ and $\gamma$ crystal forms of them Regarding chlorogallium phthalocyanine, *Denshishashin Gakkaishi* (Journal of Electrophotographic Society), vol. 26 (3), 240 (1987) discloses crystal forms of chlorogallium phthalocyanine having particular Bragg angles. However, the disclosed ones are different from the novel crystals of the present invention with respect to the crystal forms of them and the publication is silent on the application of the disclosed crystals to electrophotography. JP-A-59-44053 and a bulletin of *Shinkyo Gihoh* CPM81-69, 39 (1981) describe application of chlorogallium phthalocyanine crystals to electrophotography; and JP-A 1-221459 describes chlorogallium phthalocyanine crystals having particular Bragg angles and an electrophotographic photoreceptor using them.

However, not only the above-mentioned chlorogallium phthalocyanines but also phthalocyanine compounds as heretofore been proposed are not sufficient in point of the light-sensitivity and durability when they are used as light-sensitive materials. In addition, with respect to manufacture of them, there are further problems that the operation for converting crystal forms of them is complicated and troublesome and control of crystal forms of them is difficult.

The present invention has been made in view of the above-mentioned problems in the prior arts.

SUMMARY OF THE INVENTION

One object of the present invention is to provide novel crystals of chlorogallium phthalocyanine.

Another object of the present invention is to provide a method of preparing novel crystals chlorogallium phthalocyanine.

Still another object of the present invention is to provide a photoconductive material comprising novel crystals of chlorogallium phthalocyanine and having high sensitivity and excellent durability.

Still another object of the present invention is to provide an electrophotographic photoreceptor using the photoconductive material.

As a result of investigation, the present inventors have found that novel crystals of chlorogallium phthalocyanine having high sensitivity and durability as a photoconductive material can be obtained by applying simple treatment to chlorogallium phthalocyanine as obtained by synthesis. On the basis of the fining, the present invention has been completed.

The present invention relates to chlorogallium phthalocyanine crystals having distinct diffraction peaks at particular angles of the Bragg angle ($2\theta \pm 0.2$) to a CuK$\alpha$ characteristic X-ray.

The particular angles are selected from the following (i), (ii) and (iii):

(i) 7.4°, 16.6°, 25.5° and 28.3°;
(ii) 6.8°, 17.3°, 23.6° and 26.9°; and
(iii) 8.7°–9.2°, 17.6°, 24.0°, 27.4° and 28.8°.

The present inventors earnestly studied methods of preparing photoconductive phthalocyanine materials and, as a result, have found that when a crude chlorogallium phthalocyanine as obtained by synthesis is mechanically ground and then subjected to treatment with a solvent capable of accelerating growth of the crystals, then the resulting crystals have, though having the same crystal form, quite different characteristics as a photoconductive material in accordance with the kind of the solvent used. The inventors have further confirmed that novel crystals of chlorogallium phthalocyanine to be obtained by mechanically grinding the crude crystals followed by treating them with a particular organic solvent display extremely excellent capacity as a photoconductive material for electrophotographic photoreceptor and thus have completed the present invention.

The present invention relates to a method of preparing novel crystals of chlorogallium phthalocyanine having strong diffraction peaks at least 7.4°, 16.6°, 25.5° and 28.3° of the Bragg angle ($2\theta \pm 0.2$) in the X-ray diffraction spectrum, in which chlorogallium phthalocyanine is mechanically ground and then treated with an aromatic alcohol.

The present invention also relates to a photoconductive material for electrophotographic photoreceptor, comprising the above-mentioned chlorogallium phthalocyanine crystals.

The present invention also relates to an electrophotographic photoreceptor, which comprises an electroconductive support having thereon a light-sensitive layer containing the above-mentioned chlorogallium phthalocyanine crystals.

DETAILED DESCRIPTION OF THE INVENTION

Figure 1:
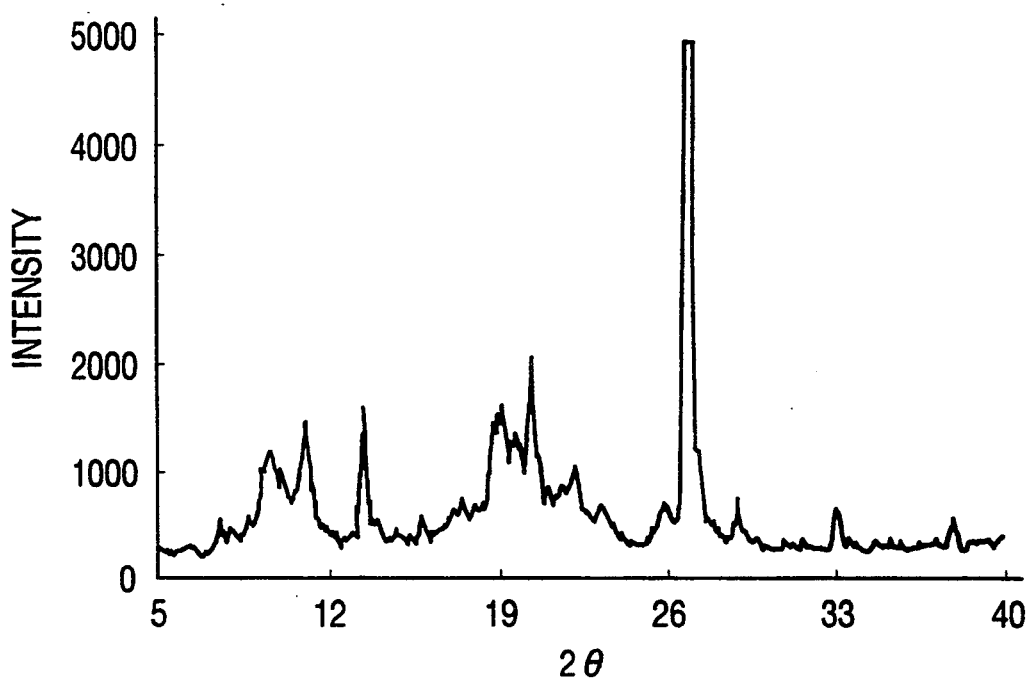
FIG. 1 shows the powder X-ray diffraction pattern of the chlorogallium phthalocyanine crystals obtained in Synthesis Example.

Chlorogallium phthalocyanine to be used in the present invention is represented by a formula (I):

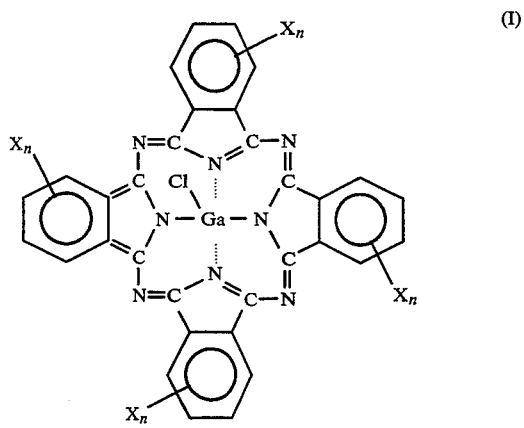

wherein X represents Cl, Br or I; and n, which may be different for each aromatic ring, represents an integer of from 0 to 4.

Methods of preparing chlorophthalocyanine crystals of the present invention are not specifically defined, and the crystals may be prepared, for example, by the known methods for preparing phtholocyanine mentioned below.

Specific examples of known method for preparing phtholocyanine include a phthalodinitrile method of heating and melting a phthalodinitrile and a metal chloride or heating them in the presence of an organic solvent; a Weiller method of heating and melting a phthalic anhydride along with a urea and a metal chloride or heating them in the presence of an organic solvent; a method of reacting cyanobenzamide and a metal salt at a high temperature; a method of reacting a dilithium phthalocyanine and a metal salt; and the like.

Organic solvents to be used in these methods are preferably inert ones having a high boiling point, such as α-chloronaphthalene, β-chloronaphthalene, α-methylnaphthalene, methoxynaphthalene, diphenylethane, ethylene glycol, dialkyl ethers, quinoline, sulforane, dichlorobenzene or dichlorotoluene. Chlorogallium phthalocyanine of the present invention can be synthesized, for example, by heating a phthalodinitrile and a gallium chloride compound in the above-mentioned organic solvent at 150° to 300° C. with stirring. In place of phthalodinitrile, indoline compounds such as diiminoisoindoline or indolenine compounds such as 1-amino-3-iminoisoindolenine can also be used.

Crystals of chlorogallium phthalocyanine as prepared by the above-mentioned method often have a large grain size and they are needed to be made fine. Making them into fine crystals may be effected by a mechanical treating method such as grinding method or by a chemical treating method such as acid-pasting method or acid-slurry method. Two or more of the treating methods may be combined. For the purpose of obtaining chlorogallium phthalocyanine crystals having the above-mentioned X-ray diffraction peaks of the present invention, the crystals obtained are dry-milled in an automatic mortar mill, planetary mill, shaking ball mill, CF mill or roller mill, and optionally thereafter wet-ground in a solvent along with grinding media.

The chlorogallium phthalocyanine crystals of the present invention preferably to have a primary grain size of 0.3 μm or less. If desired, a grinding aid such as sodium chloride or Glauber's salt may be used.

As the grinding media to be used in wet-grinding, glass beads, steel beads and alumina beads which are generally used for the purpose can be used.

Examples of the solvent used in wet-grinding include aromatic solvents such as toluene or chlorobenzene; amide solvents such as DMF or N-methylpyrrolidone; alcohol solvents such as methanol, ethanol or n-butanol; polyhydric alcohol solvents such as ethylene glycol, glycerin or polyethylene glycol; ketone solvents such as cyclohexanone or methyl ethyl ketone; halogen solvents such as methylene chloride; and water and ether solvents. A single solvent of one of them or a mixed solvent composed of two or more of them may be used in the present invention. Examples of the grinding and milling device include a ball mill, an attritor, a roll mill, a sand mill and a homomixer, but these are not limitative. The amount of the solvent to be used is generally from 1 to 200 parts, preferably from 10 to 100 parts, per 1 part of chlorogallium phthalocyanine.

The treating time for wet-grinding is preferably 4 hours or more; and the treating temperature therefor is generally from 0° C. to the boiling point of the solvent used, and preferably from 10° to 60° C.

Among the chlorogallium phthalocyanine crystals of the present invention, those having distinct diffraction peaks at (i) 7.4°, 16.6°, 25.5° and 28.3° of the Bragg angle ($2\theta \pm 0.2$) to a CuKα characteristic X-ray can be produced preferably by the method of present invention.

Specifically, chlorogallium phthalocyanine crystals of the present invention can be obtained by mechanically grinding chlorogallium phthalocyanine to be obtained by anyone of the above-mentioned known methods followed by treating it with an aromatic alcohol.

Examples of the means of mechanically grinding chlorogallium phthalocyanine used in the method of the present invention include devices of automatic mortar grinder, kneader, planetary ball mill, shaking ball mill, CF mill and roller mill, which, however, are not limitative. If desired, a grinding aid which may easily be removed after grinding, such as sodium chloride or Glauber's salt, may be used in grinding.

Example of the aromatic alcohols usable in the method of the present invention include benzyl alcohol, phenethyl alcohol, α-phenylethyl alcohol and m-tolylcarbinol. Among these, benzyl alcohol is preferably used.

In the solvent treatment, the proportion of the chlorogallium phthalocyanine crystals to the aromatic alcohol is not particularly limited. In consideration of the contact efficiency of the two components, it is generally within the range of from 1/0.1 to 1/100, preferably from 1/0.5 to 1/10, and more preferably from 1/1.5 to 1/7. The treating temperature of treating chlorogallium phthalocyanine with an aromatic alcohol is generally from 0° C. to 200° C., preferably from 20° C., to 150° C., and more preferably from 20° to 70° C. If the treating temperature is too high, a part of chlorogallium phthalocyanine tends to decompose. If it is too low, the crystal conversion would need too long time impractically. The treating time is defined on the basis of the treating temperature and the amount of the aromatic alcohol used. For instance, where the treating temperature is 25° C., the treating time is preferably from 12 to 50 hours.

The treating method is not particularly limited. Preferably, chlorogallium phthalocyanine and an aromatic alcohol are wet-milled along with grinding media such as glass beads, steel beads or alumina beads by known methods of using a ball mill, attritor or sand mill; or they may be blended in a stirring tank.

It can be presumed that the reason why the chlorogallium phthalocyanine crystals as treated by the above-mentioned treating method have, though having the same crystal form, quite different characteristics as a photoconductive material in accordance with the kind of the solvent used is based on the difference in delicate crystal surface defects caused by the difference in the growing direction and the growing speed of the chlorogallium phthalocyanine crystals treated. Such difference is presumed to be based on the difference in the solubility of dissolving impurities between the solvents as well as in the solubility of dissolving chlorogallium phthalocyanine crystals between the solvents.

The chlorogallium phthalocyanine crystals of the present invention to be obtained by treatment with an aromatic alcohol have distinct diffraction peaks at the particular angles of the Bragg angle ($2\theta \pm 0.2$) in the CuKα characteristic X-ray diffraction spectrum and display extremely excellent capacity as a novel photoconductive material for electrophotographic photoreceptor.

The chlorogallium phthalocyanine crystals of the present invention having distinct diffraction peaks at (ii) 6.8°, 17.3°, 23.6° and 26.9° of the Bragg angle ($2\theta \pm 0.2$) to a CuKα characteristic X-ray can be produced by mechanically grinding chlorogallium phthalocyanine and then treating with methylene chloride. As the other conditions for the production, those for the chlorogallium phthalocyanine crystals having distinct diffraction peaks at (i) 7.4°, 16.6°, 25.5° and 28.3° can be employed.

The chlorogallium phthalocyanine crystals of the present invention having distinct diffraction peaks at (iii) 8.7°–9.2°, 17.6°, 24.0°, 27.4° and 28.8° of the Bragg angle ($2\theta \pm 0.2$) to a CuKα characteristic X-ray can be produced by mechanically grinding chlorogallium phthalocyanine and then treating with lower alcohol solvents. As the other conditions for the production, those for the chlorogallium phthalocyanine crystals having distinct diffraction peaks at (i) 7.4°, 16.6°, 25.5° and 28.3° can be employed.

The present invention also provides an electrophotographic photoreceptor, which comprises the above-mentioned chlorogallium phthalocyanine crystals as the photoconductive material in the light-sensitive layer. The photographic photoreceptor will be explained in detail hereunder.

In the photographic photoreceptor of the present invention, the light-sensitive layer may be a single layer or may also have a laminated structure comprising a charge generating layer and a charge transporting layer each having a different function.

In the latter case, the charge generating layer is composed of the above-mentioned chlorogallium phthalocyanine crystals and a binder resin.

The binder resin to be in the layer may be selected from insulating resins of a broad range or may also be selected from organic photoconductive polymers such as poly-N-vinyl carbazole, polyvinyl anthracene, and polyvinyl pyrene. Preferred examples of the binder resin include insulating resins such as a polyvinyl acetal resin (e.g., a polyvinyl butyral resin, a polyvinyl formal resin, and a partially acetal-modified polyvinyl butyral resin in which the butyral groups of a polyvinyl butyral are partially modified with a formal, an acetoacetal, etc.), a polyarylate resin (e.g., a polycondensate of bisphenol A and phthalic acid), a polycarbonate resin, a polyester resin, a modified ester polyester resin, a phenoxy resin, a polyvinyl chloride resin, a polyvinyl idene chloride resin, a polyvinyl acetate resin, a polystyrene resin an acrylic resin, a methacrylic resin, a polyacrylamide resin, a polyamide resin, a polyvinyl pyridine resin, a cellulose resin, a polyurethane resin, an epoxy resin, a silicone resin, a polyvinyl alcohol resin, a polyvinyl pyrrolidone resin, casein, a vinyl chloride-vinyl acetate copolymer resin (e.g., a vinyl chloride-vinyl acetate copolymer, a hydroxyl-modified vinyl chloride-vinyl acetate copolymer, a carboxyl-modified vinyl chloride-vinyl acetate copolymer, a vinyl chloride-vinyl acetate-maleic anhydride terpolymer, etc.), a styrene-butadiene copolymer resin, a polyvinylidene chloride-acrylonitrile copolymer resin, a sytrene-alkyd resin, a silicone-alkyd resin, and a phenol-formaldehyde resin. However, the binder is not limited to the above-mentioned organic photoconductive polymers or insulating resins. The binder may be used singly or in combination of two or more of them.

Among the above-mentioned binder resins, at least one of a polyvinyl acetal resin, a vinyl chloride-vinyl acetate copolymer resin, a phenoxy resin, and a modified ether polyester resin are preferably used in the present invention, in view of the dispersibility of the chlorogallium phthalocyanine crystals in the binder resin, the coating properties of the dispersion, and the sensitivity, charge retention and image equality of the photoreceptor. Furthermore, the combinations of these binder resins and the chlorogallium phthalocyanine crystals having distinct diffraction peaks at (i) 7.4°, 16.6°, 25.5° and 28.3° of the Bragg angle ($2\theta \pm 0.2$) to CuK$\alpha$ characteristic X-ray are particularly preferred since the photographic properties of the electrophotographic photoreceptor are excellent.

The charge generating layer may be formed by dispersing the above-mentioned chlorogallium phthalocyanine crystals in a solution containing the above-mentioned binder resin as dissolved in an organic solvent to prepare a coating composition followed by coating the composition on an electroconductive support. The proportion of the chlorogallium phthalocyanine crystals to the binder resin is generally from 40/1 to 1/10, preferably from 10/1 to 1/4, by weight. If the proportion of the chlorogallium phthalocyanine crystals is too high, the stability of the coating liquid tends to become lower. If it is too low, the sensitivity tends to become lower. Therefore, the also proportion range is preferred.

The solvent to be used is preferably selected from those which do not dissolve the adjacent subbing layer, which will be mentioned below, as well as the adjacent charge transporting layer. Specific examples of the organic solvents include alcohols such as methanol, ethanol, n-propanol, isopropanol n-butanol and benzyl alcohol; ketones such as acetone, methyl ethyl ketone and cyclohexanone; amides such as N,N-dimethylformamide and N,N-dimethylacetamide; sulfoxides such as dimethylsulfoxide; cyclic or straight-chain ethers such as tetrahydrofuran, dioxane, diethyl ether, methyl cellosolve and ethyl cellosolve; esters such as methyl acetate, ethyl acetate and n-butyl acetate; halogenated aliphatic hydrocarbons such as chloroform, methylene chloride, dichloroethylene, carbon tetrachloride and trichloroethylene; mineral oils such as ligroin; and aromatic hydrocarbons such as benzene, toluene and dichlorobenzene. These solvents may be used singly or in combination of two or more of them.

Coating of the coating liquid may be effected by any ordinary coating method, such as dip coating method, spray coating method, spinner coating method, bead coating method, wire bar coating method, blade coating method, roller coating method or curtain coating method. Drying of the coated layer is preferably effected by drying to touch at room temperature followed by hot drying under heat. The hot drying may be effected at a temperature of from 30° to 200° C. for a period of from 5 minutes to 2 hours under static condition or with blowing. The thickness of the charge generating layer may be, in general, approximately from 0.05 to 5 μm.

The charge transporting layer is composed of a charge transporting material and a binder resin.

As the charge transporting material, any conventional compounds can be used. Examples thereof include polycyclic aromatic compounds such as anthracene, pyrene and phenanthrene compounds; nitrogen-containing heterocyclic compounds such as indole, carbazole and imidazole compounds; as well as pyrazoline compounds, hydrazone compounds, triphenylmethane compounds, triphenylamine compounds, enamine compounds, and stilbene compounds.

In addition, photoconductive polymers can also be used as the charge transporting material. Examples thereof include poly-N-vinyl carbazole, halogenated poly-N-vinyl carbazoles, polyvinyl anthracene, poly-N-vinylphenyl anthracene, polyvinyl pyrene, polyvinyl acridine, polyvinyl acenaphthylene, polyglycidyl dicarbazole, pyrene-formaldehyde resins, and ethylcarbazole-formaldehyde resins. These photoconductive polymers may form the layer by themselves.

In the present invention, a benzidine compound represented by formula (I) is preferably used as a charge transporting material:

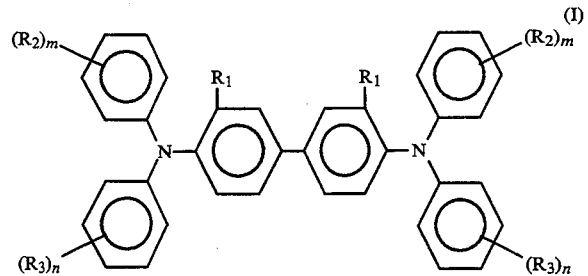

wherein $R_1$ represents a hydrogen atom, an alkyl group, an alkoxy group, or a halogen atom, two groups represented by $R_1$ may be the same or different; $R_2$ and $R_3$ represents a hydrogen atom, an alkyl group, an alkoxy group, a halogen atom, or a substituted amino group, two groups represented by $R_2$ may be the same or different, two groups represented by $R_3$ may be the same or different; and m and n, which may be the same or different, each represents an integer of from 0 to 2.

Excellent electrophotographic characteristics such as high sensitivity and high stability upon repeated use can be obtained by using the above benzidine compound, since it exhibits high solubility in solvents and high compatibility to binder resins, so as to form a uniform coating and a uniform interface.

Specific examples of the benzidine compound represented by formula (I) are shown in Table A below in terms of the substituents $R_1$, $R_2$ and $R_3$. The numeral before the substituent indicates the position on the aromatic ring at which the substituent is bonded.

TABLE A

| Compound No. | $R_1$ | $(R_2)_m$ | $(R_3)_n$ |
|---|---|---|---|
| 1 | $CH_3$ | H | H |
| 2 | $CH_3$ | 2-$CH_3$ | H |
| 3 | $CH_3$ | 3-$CH_3$ | H |
| 4 | $CH_3$ | 4-$CH_3$ | H |
| 5 | $CH_3$ | 4-$CH_3$ | 2-$CH_3$ |
| 6 | $CH_3$ | 4-$CH_3$ | 3-$CH_3$ |
| 7 | $CH_3$ | 4-$CH_3$ | 4-$CH_3$ |
| 8 | $CH_3$ | 3,4-$CH_3$ | H |
| 9 | $CH_3$ | 3,4-$CH_3$ | 3,4-$CH_3$ |
| 10 | $CH_3$ | 4-$C_2H_5$ | H |
| 11 | $CH_3$ | 4-$C_3H_7$ | H |
| 12 | $CH_3$ | 4-$C_4H_9$ | H |
| 13 | $CH_3$ | 4-$C_2H_5$ | 2-$CH_3$ |
| 14 | $CH_3$ | 4-$C_2H_5$ | 3-$CH_3$ |
| 15 | $CH_3$ | 4-$C_2H_5$ | 4-$CH_3$ |
| 16 | $CH_3$ | 4-$C_2H_5$ | 3,4-$CH_3$ |
| 17 | $CH_3$ | 4-$C_3H_7$ | 3-$CH_3$ |
| 18 | $CH_3$ | 4-$C_3H_7$ | 4-$CH_3$ |
| 19 | $CH_3$ | 4-$C_4H_9$ | 3-$CH_3$ |
| 20 | $CH_3$ | 4-$C_4H_9$ | 4-$CH_3$ |
| 21 | $CH_3$ | 4-$C_2H_5$ | 4-$C_2H_5$ |
| 22 | $CH_3$ | 4-$C_2H_5$ | 4-$OCH_3$ |
| 23 | $CH_3$ | 4-$C_3H_7$ | 4-$C_3H_7$ |
| 24 | $CH_3$ | 4-$C_3H_7$ | 4-$OCH_3$ |
| 25 | $CH_3$ | 4-$C_4H_9$ | 4-$C_4H_9$ |
| 26 | $CH_3$ | 4-$C_4H_9$ | 4-$OCH_3$ |
| 27 | Cl | H | H |
| 28 | Cl | 2-$CH_3$ | H |
| 29 | Cl | 3-$CH_3$ | H |
| 30 | Cl | 4-$CH_3$ | H |
| 31 | Cl | 4-$CH_3$ | 2-$CH_3$ |
| 32 | Cl | 4-$CH_3$ | 3-$CH_3$ |
| 33 | Cl | 4-$CH_3$ | 4-$CH_3$ |
| 34 | $C_2H_5$ | H | H |
| 35 | $C_2H_5$ | 2-$CH_3$ | H |
| 36 | $C_2H_5$ | 3-$CH_3$ | H |
| 37 | $C_2H_5$ | 4-$CH_3$ | H |
| 38 | $C_2H_5$ | 4-$CH_3$ | 4-$CH_3$ |
| 39 | $C_2H_5$ | 4-$C_2H_5$ | 4-$CH_3$ |
| 40 | $C_2H_5$ | 4-$C_3H_7$ | 4-$CH_3$ |
| 41 | $C_2H_5$ | 4-$C_4H_9$ | 4-$CH_3$ |
| 42 | $OCH_3$ | H | H |
| 43 | $OCH_3$ | 2-$CH_3$ | H |
| 44 | $OCH_3$ | 3-$CH_3$ | H |
| 45 | $OCH_3$ | 4-$CH_3$ | H |
| 46 | $OCH_3$ | 4-$CH_3$ | 4-$CH_3$ |
| 47 | $OCH_3$ | 4-$C_2H_5$ | 4-$CH_3$ |
| 48 | $OCH_3$ | 4-$C_3H_7$ | 4-$CH_3$ |
| 49 | $OCH_3$ | 4-$C_4H_9$ | 4-$CH_3$ |
| 50 | $CH_3$ | 2-$N(CH_3)_2$ | H |
| 51 | $CH_3$ | 3-$N(CH_3)_2$ | H |
| 52 | $CH_3$ | 4-$N(CH_3)_2$ | H |
| 53 | H | 2-$CH_3$ | H |
| 54 | H | 3-$CH_3$ | H |
| 55 | H | 4-$CH_3$ | H |
| 56 | H | 4-$CH_3$ | 4-$CH_3$ |
| 57 | H | 4-$CH_3$ | 4-$C_2H_5$ |

TABLE A-continued

| Compound No. | $R_1$ | $(R_2)_m$ | $(R_3)_n$ |
|---|---|---|---|
| 58 | H | 3-$CH_3$ | 3-$CH_3$ |

As the benzidine compound represented by formula (I), those represented by formula (II) and formula (III) are more preferred in the present invention:

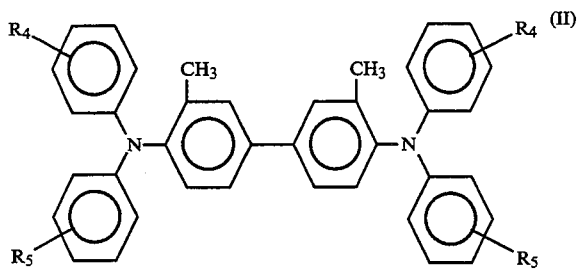

wherein $R_4$ and $R_5$, which may be the same or different, each represents a hydrogen atom or a methyl group, two groups represented by $R_4$ may be the same or different, and two groups represented by $R_5$ may be the same or different;

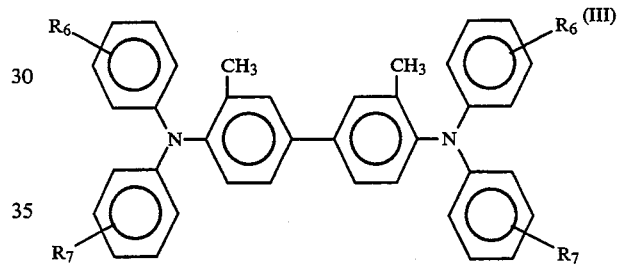

wherein one of $R_6$ and $R_7$ represents an alkyl group having 2 or more carbon atoms; the other represents a hydrogen atom, an alkyl group, an alkoxy group, or a substituted alkyl group; two groups represented by $R_6$ may be the same or different; and two groups represented by $R_7$ may be the same or different.

As the binder resin for the charge transporting layers, the same insulating resins as those mentioned in the charge generating layer may be used.

The charge transporting layer may be formed by preparing a coating composition from the above-mentioned charge transporting material, the binder resin and an organic solvent like that mentioned above, followed by coating the composition in the same manner as mentioned above for the charge generating layer. The proportion of the charge transporting material to the binder resin generally fall within the range of from 5/1 to 1/5 by weight. The thickness of the charge transporting layer is generally within the range of approximately from 5 to 50 μm.

Where the electrophotographic photoreceptor of the present invention has a single layer constitution, the light-sensitive layer comprises a photoconductive layer having such constitution that the above-mentioned chlorogallium phthalocyanine crystals are dispersed in a layer comprising a charge transporting material and a binder resin. The proportion of the charge transporting material to the binder resin is preferably within the range of approximately from 1/20 to 5/1 by weight; and that of the chlorogallium phthalocyanine crystals to the charge transporting material is preferably within the range of approximately from 1/10 to 10/1 by weight. As the charge transporting material and the binder resin, those as mentioned above can be used; and the photoconductive layer may be formed in the same manner as mentioned above.

In the present invention, it is particularly preferred that the light-sensitive layer comprises a charge generating layer having thereon a charge transporting layer, and the charge generating layer contains the chlorogallium phthalocyanine crystals and the binder resin.

As the electroconductive support, any conventional materials used in ordinary electrophotographic photoreceptors can be used.

In the present invention, the electroconductive support may be coated with a subbing layer. Such a subbing layer is effective for inhibiting injection of any unnecessary charges from the electroconductive support and has an activity of elevating the charging property of the light-sensitive layer. In addition, it also has another function of improving the adhesiveness between the light-sensitive layer and the electroconductive support.

Examples of the material of constituting the subbing layer include polyvinyl alcohol, polyvinyl pyrrolidone, polyvinyl pyridine, cellulose ethers, cellulose esters, polyamides, polyurethane, casein, gelatin, polyglutamic acid, starch, starch acetate, aminostarches, polyacrylic acids, polyacrylamide, zirconium chelate compounds, zirconium alkoxide compounds, organic zirconium compounds, titanyl chelate compounds, titanyl alkoxide compounds, organic titanyl compounds and silane coupling agents. The thickness of the subbing layer preferably falls within the range of approximately from 0.05 to 2 $\mu$m.

The present invention will be explained in more detail by way of the following examples, which, however, are not intended to restrict the scope of the present invention. Unless otherwise specifically defined, all "parts" therein are by weight.

SYNTHESIS EXAMPLE

Synthesis of chlorogallium phthalocyanine crystal:

30 parts of 1,3-diiminoisoindoline and 9.1 parts of gallium trichloride were put in 230 parts of quinoline and reacted for 3 hours at 200° C. The product formed was taken out by filtration, washed with acetone and methanol and dried to obtain 28 parts of chloroindium phthalocyanine crystals. FIG. 1 shows the X-ray powder diffraction pattern of the chlorogallium phthalocyanine crystals obtained.

EXAMPLE 1

Figure 2:
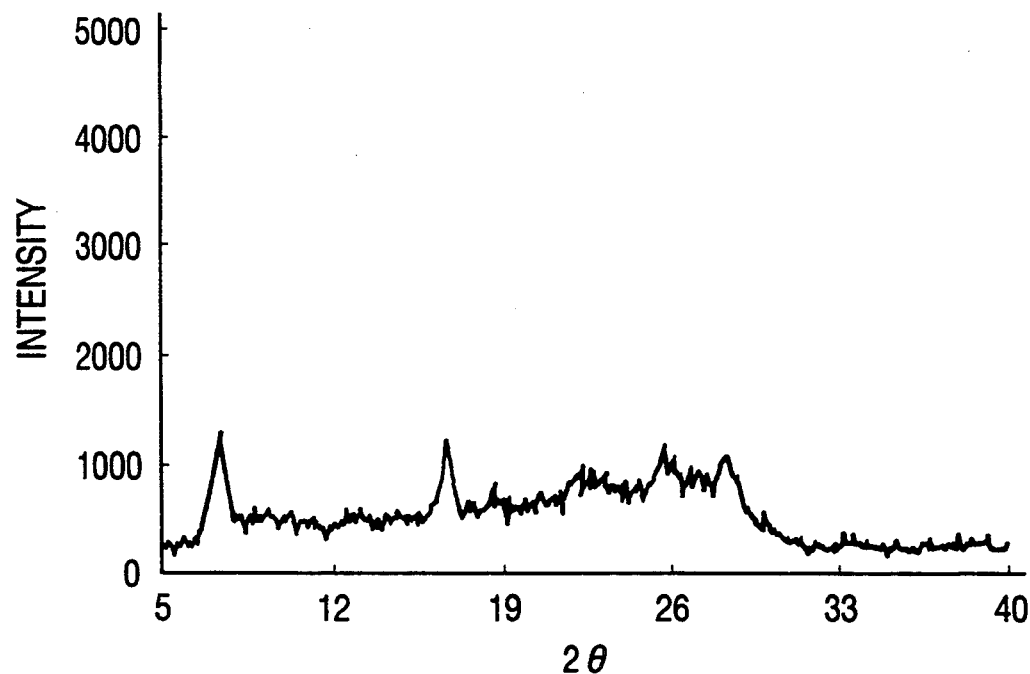
FIG. 2 shows the powder X-ray diffraction pattern of the chlorogallium phthalocyanine crystals obtained in Example 1.

3.0 parts of the chlorogallium phthalocyanine obtained in the previous production example was dry-ground in an automatic mortar grinder (Lab-Mill UT-20 Model; manufactured by Yamato Kagaku Co.). Powder of low crystalinity was obtained. FIG. 2 shows the X-ray powder powder diffraction pattern of the sample.

EXAMPLE 2

Figure 3:
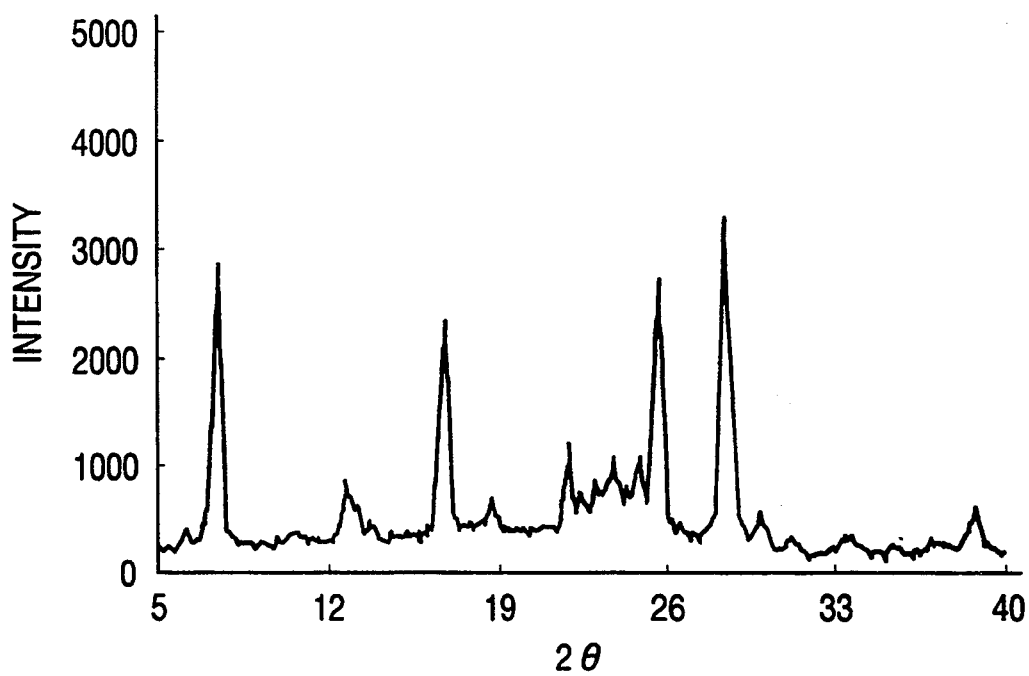
FIG. 3 shows the powder X-ray diffraction pattern of the chlorogallium phthalocyanine crystals obtained in Example 2.

0.5 part of the chlorogallium phthalocyanine crystals as obtained in Example 1 were milled in a ball mill along with 60 parts of glass beads (diameter: 1 mm) in 20 parts of 1/10 mixed solvent of water/monochlorobenzene at room temperature for 24 hours. After filtered and washed with 10 parts of methanol, chlorogallium phthalocyanine crystals were obtained. FIG. 3 shows the X-ray powder diffraction pattern of the chlorogallium phthalocyanine crystals obtained.

EXAMPLE 3

Figure 4:
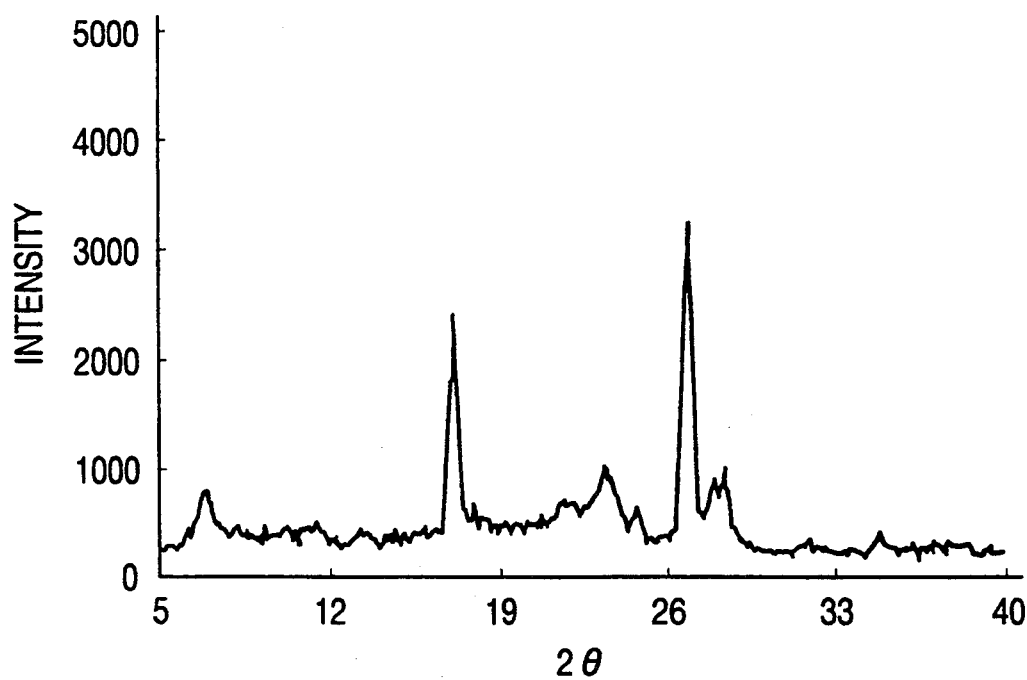
FIG. 4 shows the powder X-ray diffraction pattern of the chlorogallium phthalocyanine crystals obtained in Example 3.
Figure 9:
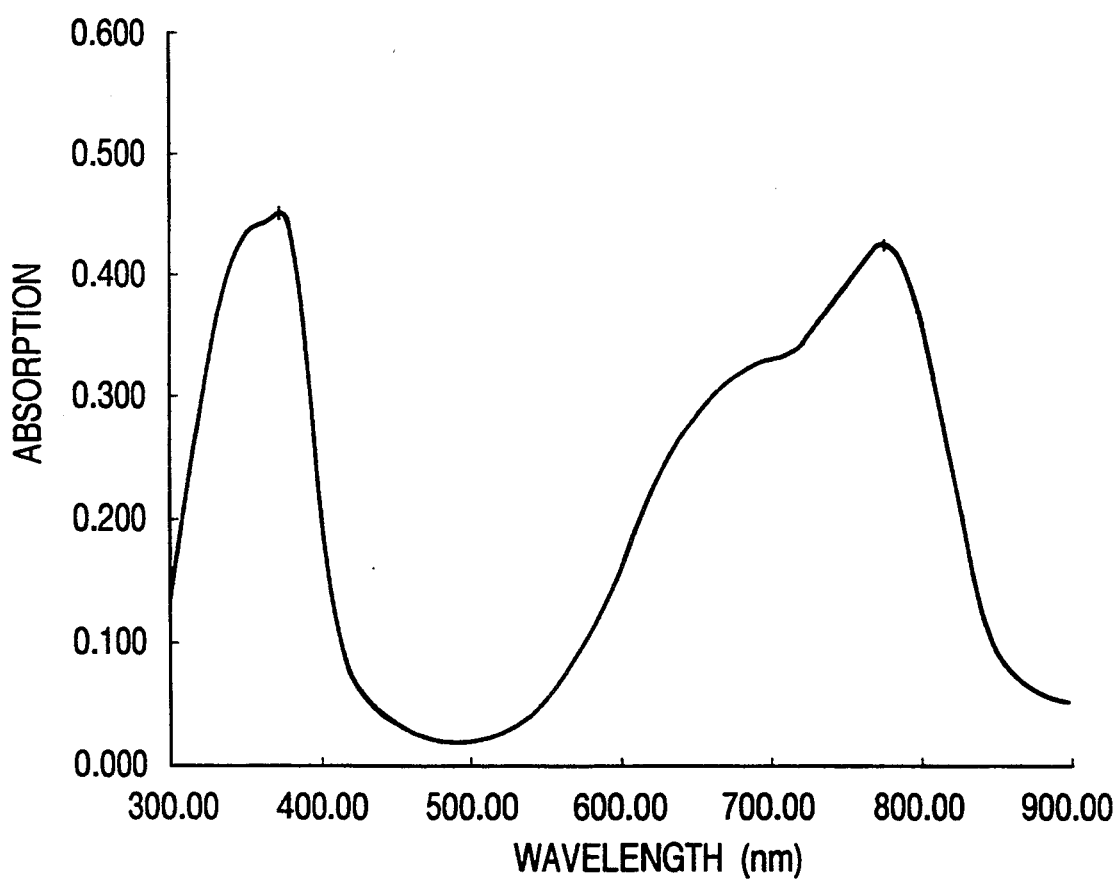
FIG. 8 and 9 show the infrared absorption spectrum and the visible-near infrared absorption spectrum, respectively, of the chlorogallium phtholocyanine crystals obtained in Example 3.
Figure 8:
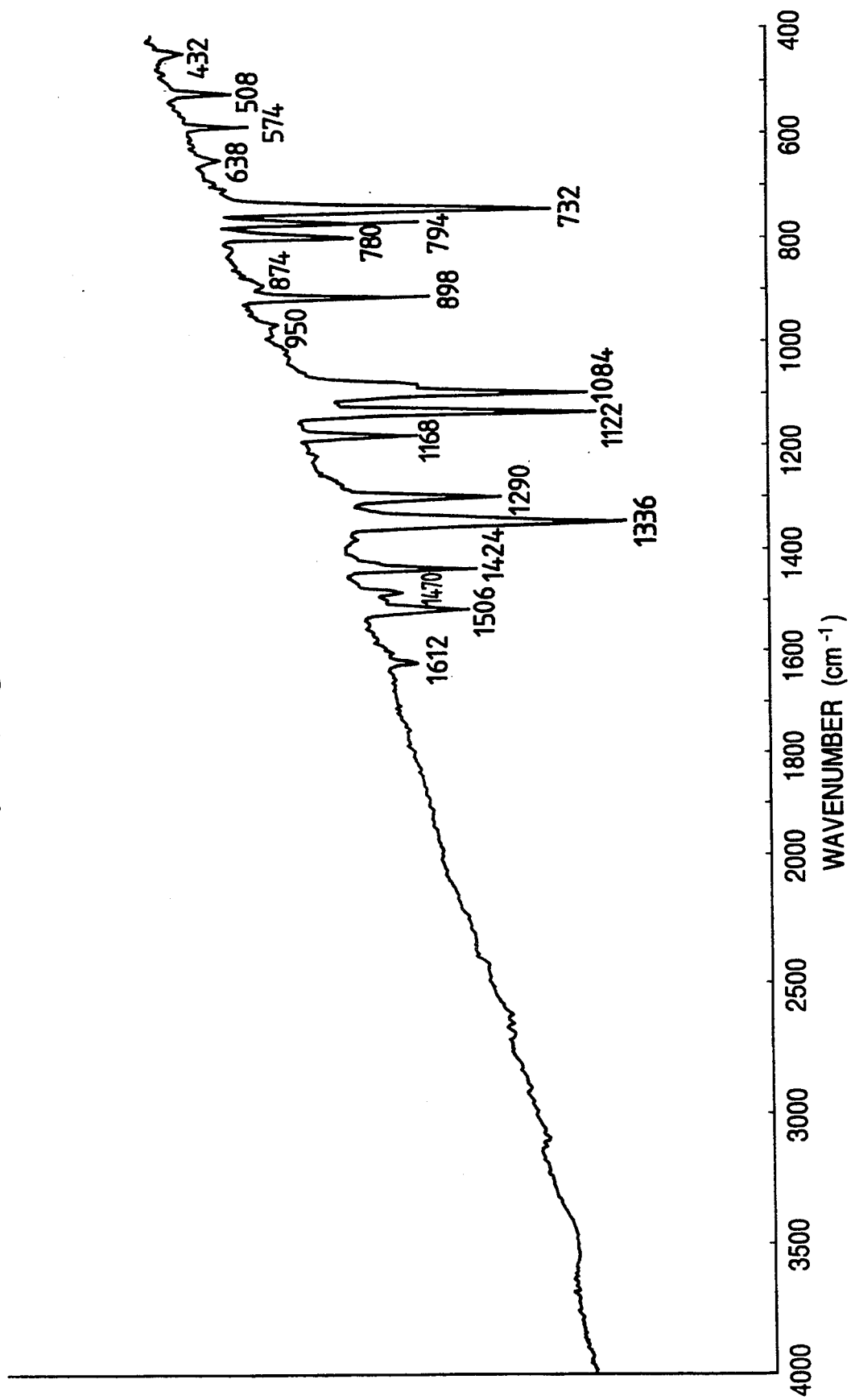

0.5 part of the chlorogallium phthalocyanine crystals as obtained in Example 1 were milled in a ball mill along with 60 parts of glass beads (diameter: 1 mm) in 20 parts of methylene chloride at room temperature for 24 hours. After filtered and washed with 10 parts of methanol, chlorogallium phthalocyanine crystals were obtained. FIG. 4 shows the X-ray powder diffraction pattern of the chlorogallium phthalocyanine crystals obtained. FIG. 8 shows the infrared absorption spectrum of the crystals. FIG. 9 shows the visible-near infrared absorption spectrum of the crystals.

EXAMPLE 4

Figure 5:
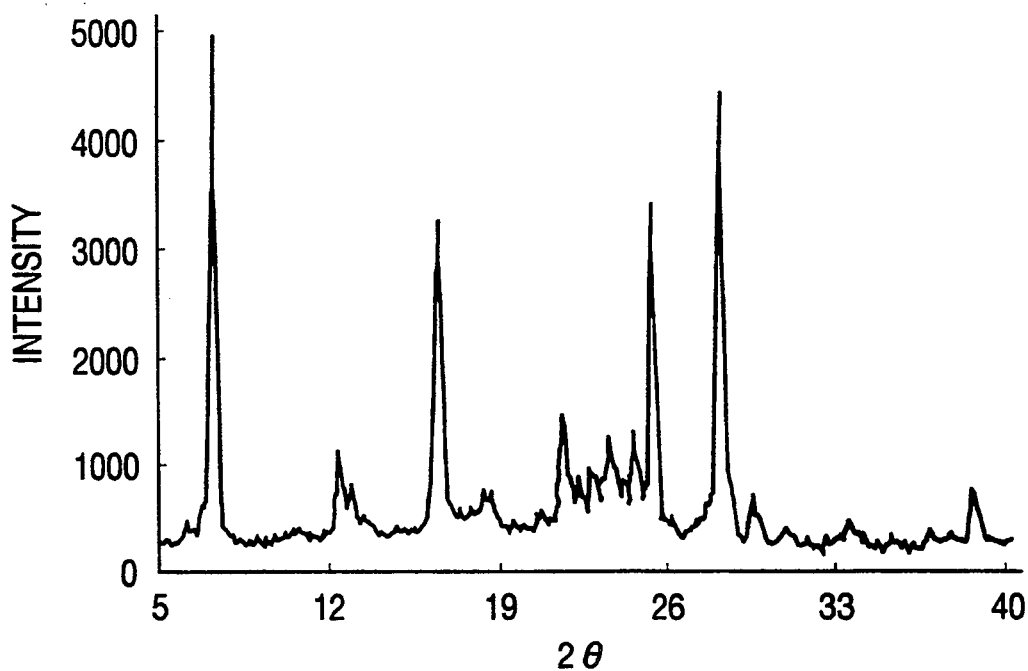
FIG. 5 shows the powder X-ray diffraction pattern of the chlorogallium phthalocyanine crystals obtained in Example 4.

0.5 part of the chlorogallium phthalocyanine crystals as obtained in Example 1 were milled in a ball mill along with 60 parts of glass beads (diameter: 1 mm) in 20 parts of monochlorobenzene at room temperature for 24 hours. After filtered and washed with 10 parts of methanol, chlorogallium phthalocyanine crystals were obtained. FIG. 5 shows the X-ray powder diffraction pattern of the chlorogallium phthalocyanine crystals obtained.

EXAMPLE 5

Figure 6:
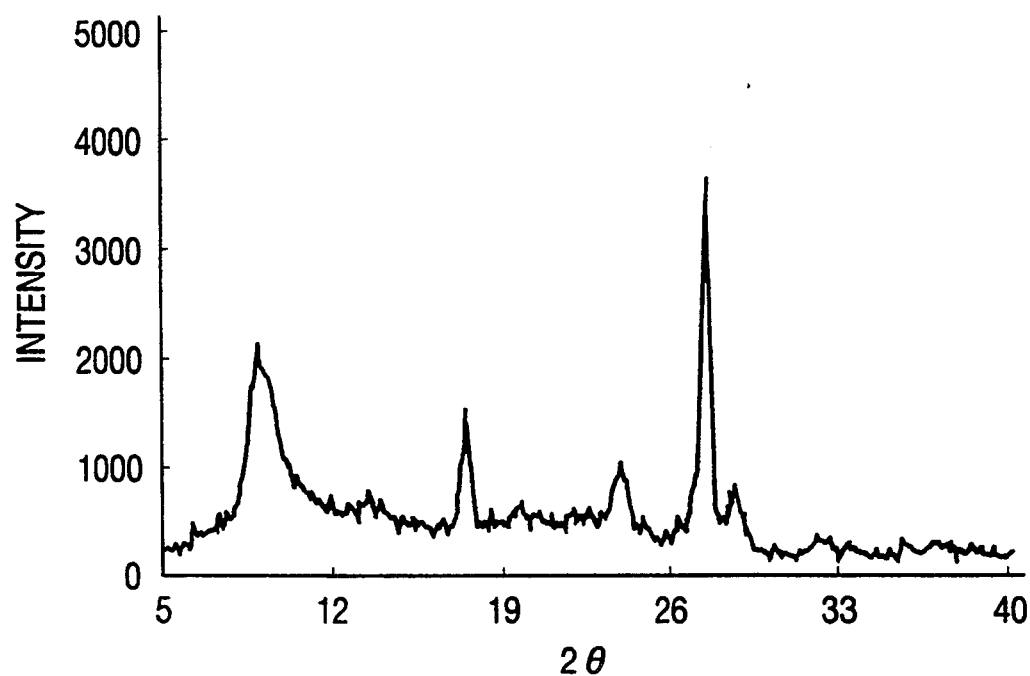
FIG. 6 shows the powder X-ray diffraction pattern of the chlorogallium phthalocyanine crystals obtained in Example 5.
Figure 10:
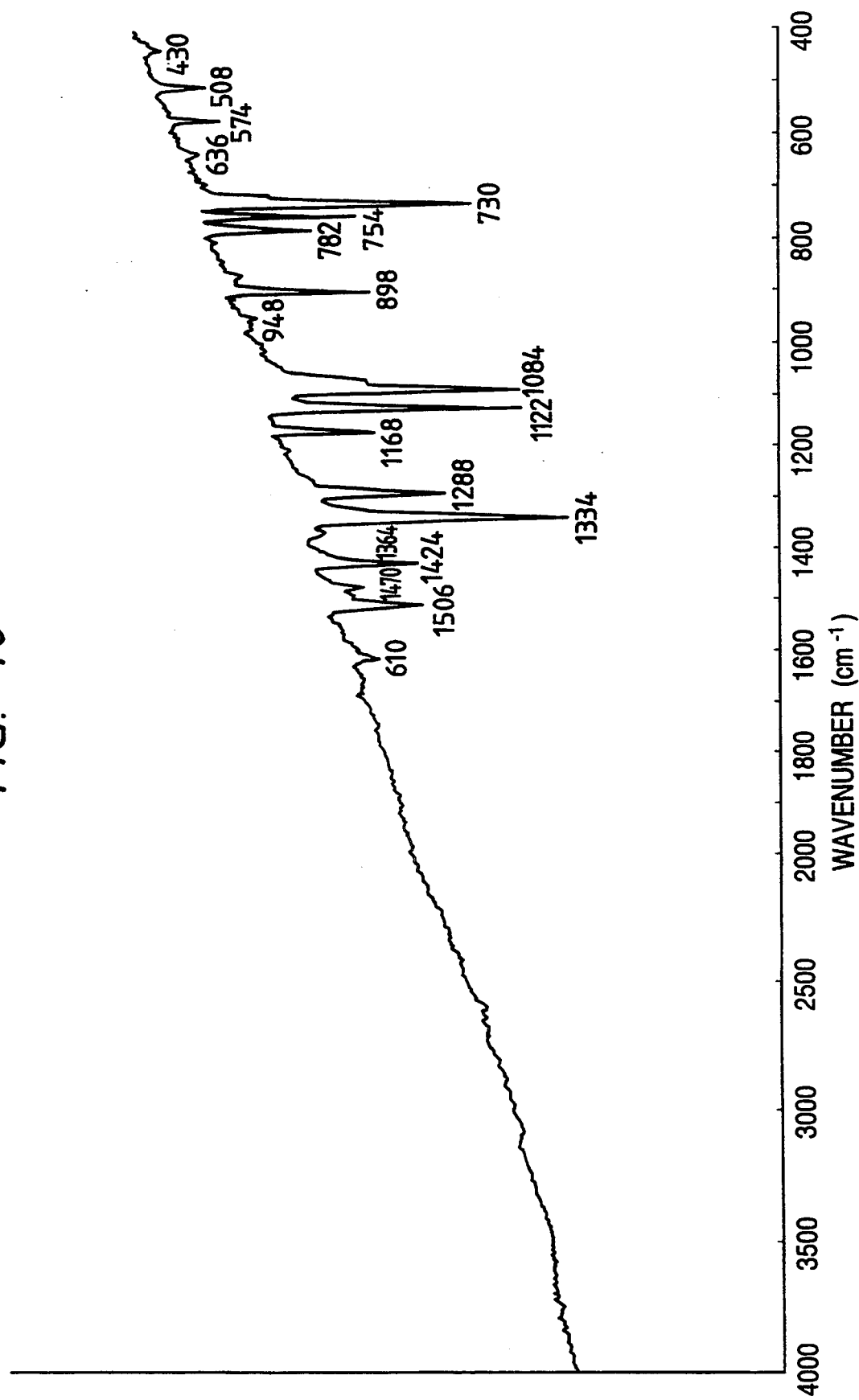
FIGS. 10 and 11 show the infrared absorption spectrum and the visible-near infrared absorption spectrum, respectively, of the chlorogallium phtholocyanine crystals obtained in Example 5.
Figure 11:
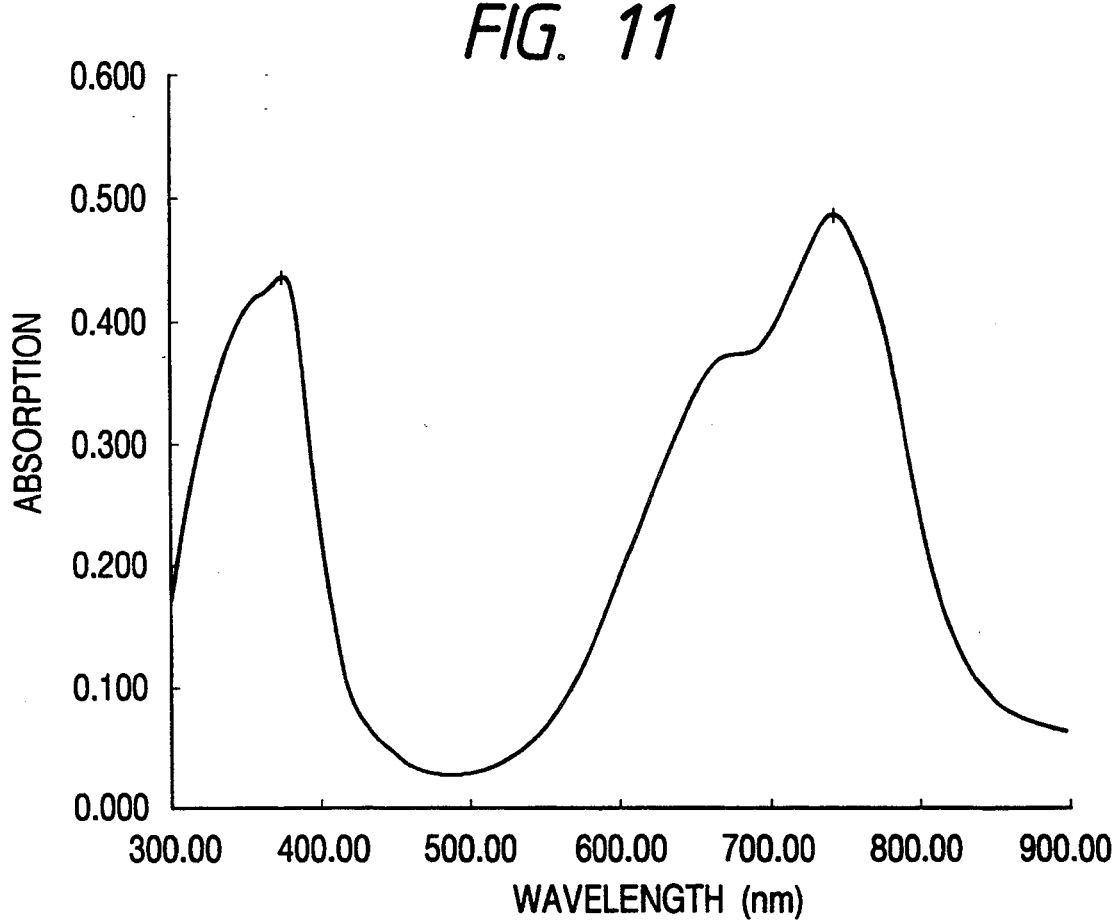

0.5 part of the chlorogallium phthalocyanine crystals as obtained in Example 1 were milled in a ball mill along with 60 parts of glass beads (diameter: 1 mm) in 20 parts of methanol at room temperature for 24 hours. After filtered and washed with 10 parts of methanol, chlorogallium phthalocyanine crystals were obtained. FIG. 6 shows the X-ray powder diffraction pattern of the chlorogallium phthalocyanine crystals obtained. FIG. 10 shows the infrared absorption spectrum of them. FIG. 11 shows the visible near infrared absorption spectrum of them.

EXAMPLES 6 TO 10

1 part of anyone of the chlorogallium phthalocyanine crystals obtained in Examples 1, 2, 3, 4 and 5 was blended with 1 part of polyvinyl butyral (S-Lec BM-1, trade name by Sekisui Chemical Co.) and 100 parts of cyclohexanone, and the blend was dispersed by treating it in a paint shaker along with glass beads for one hour. The thus obtained coating composition was coated on an aluminium substrate by a dip-coating method and dried under heat at 100° C. for 5 minutes to form a charge generating layer having a thickness of 0.2 $\mu$m.

Next, 2 parts of N,N'-diphenyl-N,N'-bis(m-tolyl)benzidine represented by formula (1):

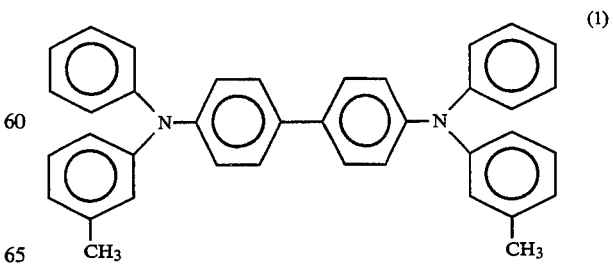

and 3 parts of poly(1,1-di(p-phenylene)cyclohexanecarbonate) represented by formula (2):

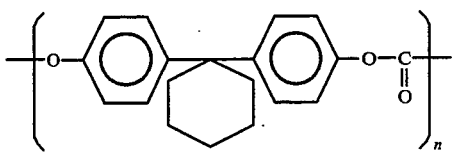

(2)

were dissolved in 20 parts of monochlorobenzene. The resulting coating composition was coated over the charge generating layer as formed on the aluminium substrate by a dip-coating method, and dried at 120° C. for one hour to form a charge transporting layer having a thickness of 20 μm.

The electrophotographic photoreceptor thus prepared was subjected to corona discharge of −6 KV so as to be charged under a normal temperature and normal humidity condition (20° C., 50% RH), using an electrostatic duplicating paper test device (EPA-8100 Model, manufactured by Kawaguchi Denki Co.). Then an 800-nm monochromatic light as derived from a tungsten lamp with a monochrometer was irradiated to the photoreceptor, the irradiated intensity being adjusted to be 1 μW/cm².

The amount of exposure $E_{\frac{1}{2}}$(erg/cm²) until the surface potential became a half ($\frac{1}{2}$) of the initial potential $V_0$ (volt) was measured. The attenuation ratio DDR (%) from the initial potential $V_0$ when the charged photoreceptor was allowed to stand in the dark for 1 second was measured. Next, a tungsten light of 10 luxes was irradiated to the surface of the photoreceptor for one second, and the residual potential $V_R$ was measured. Further, the above charging and exposure cycle was repeated 1000 times whereupon $V_0$, $E_{\frac{1}{2}}$ and $V_R$ were measured. The results obtained are shown in Table 1 below.

COMPARATIVE EXAMPLE 1

A comparative electrophotographic photoreceptor sample was prepared in the same manner as in Example 6, except that chlorogallium oxyphthalocyanine crystals having an X-ray powder diffraction pattern as shown in FIG. 1 was used in preparing the charge generating layer and the charge transporting layer. This was evaluated in the same manner as in Example 6 and the results obtained are shown in Table 1.

EXAMPLE 11

0.5 part of the chlorogallium phthalocyanine crystals as obtained in Example 1 were milled in a ball mill along with 60 parts of glass beads (diameter: 1 mm) in 20 parts of ethylene glycol at room temperature for 20 hours. After filtered and washed with 10 parts of methanol, chlorogallium phthalocyanine crystals were obtained.

Figure 7:
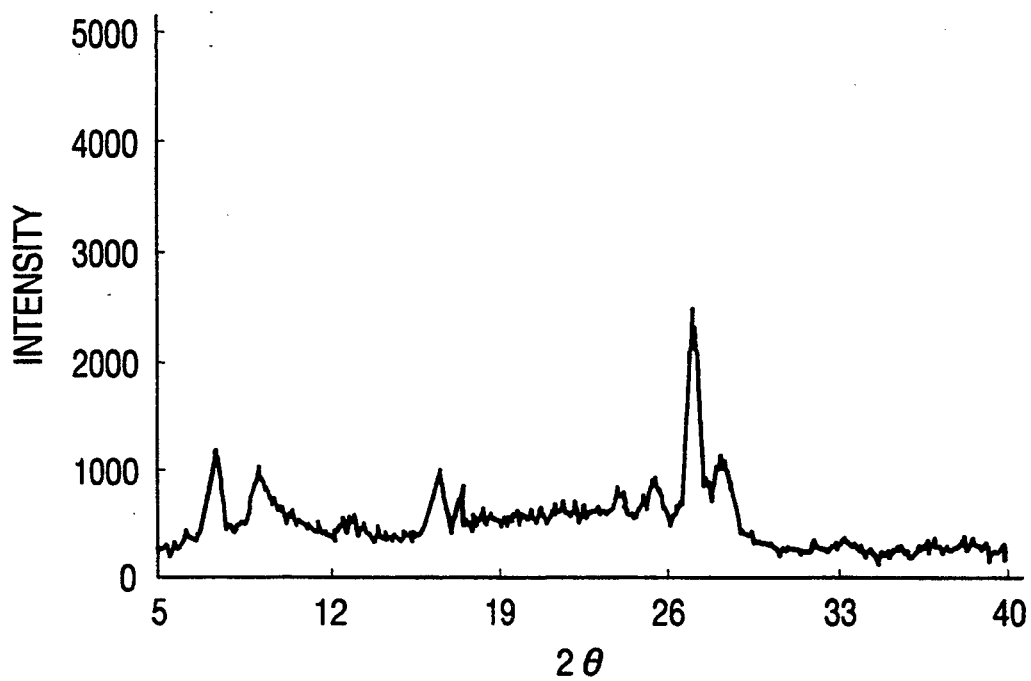
FIG. 7 shows the powder X-ray diffraction pattern of the chlorogallium phthalocyanine crystals obtained in Example 11.

FIG. 7 shows the X-ray powder diffraction pattern of the chlorogallium phthalocyanine crystals obtained. The crystals obtained were considered to be mixed crystals compound of crystals of FIG. 3 and crystals of FIG. 6.

Next, using the crystals thus formed, a charge generating layer and a charge transporting layer were formed on an aluminium substrate in the same manner as in Example 6 to prepare an electrophotographic photoreceptor. This was evaluated in the same manner as in Example 6. The results obtained are shown in Table 1.

TABLE 1

| | | Characteristics of Photoreceptor Samples | | | | | | | |
|---|---|---|---|---|---|---|---|---|---|
| | XRD Patter | Initial Characterisitics | | | | Characteristics after 1000 repetitions of charging-exposure cycle | | | |
| Example No. | of ClGaPc Used | $V_0$ (V) | $E_{\frac{1}{2}}$ (erg/cm²) | DDR (%) | $V_R$ (V) | $V_0$ (V) | $E_{\frac{1}{2}}$ (erg/cm²) | DDR (%) | $V_R$ (V) |
| Example 6 | FIG. 2 | −860 | 2.6 | 2.2 | 2.0 | −853 | 2.7 | 2.3 | 2.8 |
| Example 7 | FIG. 3 | −820 | 2.5 | 2.4 | 2.1 | −810 | 2.6 | 2.5 | 2.0 |
| Example 8 | FIG. 4 | −840 | 2.8 | 2.3 | 2.3 | −830 | 2.9 | 2.4 | 2.8 |
| Example 9 | FIG. 5 | −810 | 2.4 | 2.0 | 2.0 | −800 | 2.5 | 2.2 | 2.8 |
| Example 10 | FIG. 6 | −800 | 2.7 | 2.2 | 2.3 | −790 | 3.0 | 2.8 | 3.0 |
| Comparative Example 1 | FIG. 1 | −760 | 3.6 | 3.0 | 3.0 | −755 | 3.8 | 3.4 | 4.2 |
| Example 11 | FIG. 7 | −780 | 3.2 | 3.1 | 2.5 | −770 | 3.3 | 3.2 | 4.1 |

EXAMPLE 12

Figure 12:
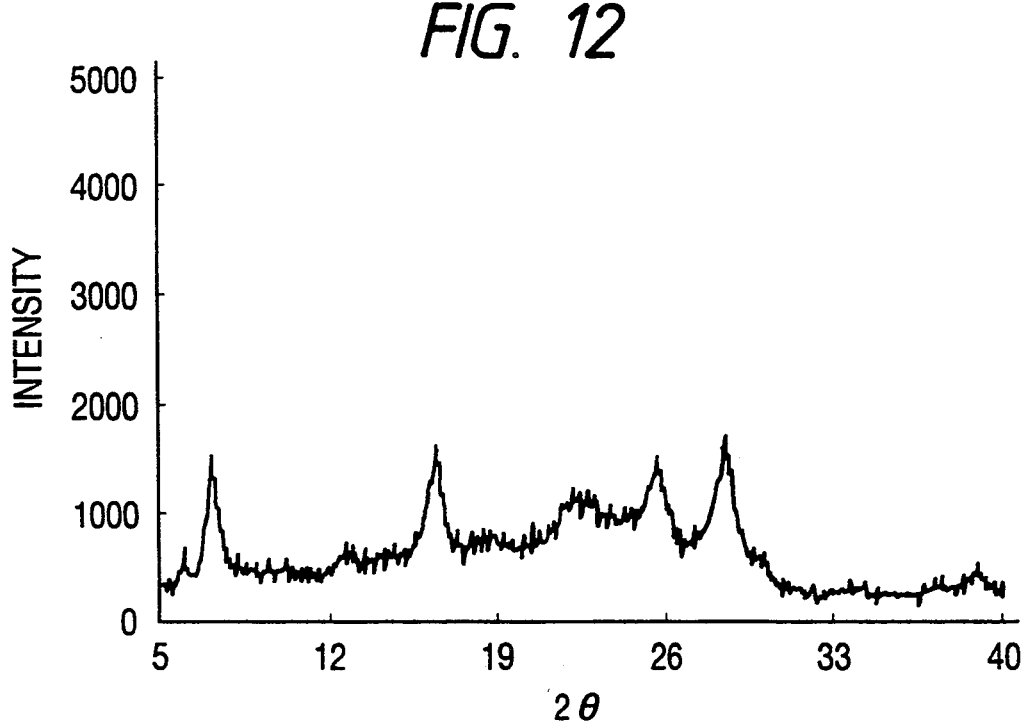
FIGS. 12 and 13 show the powder X-ray diffraction patterns of chlorogallium phtholocyanine crystals obtained in Example 12.

30 parts of the chlorogallium phthalocyanine as obtained in Synthesis Example was ground in a planetary ball mill (P-5 Model, manufactured by Frish Co.) along with 200 parts of agate balls (diameter: 20 mm) 100 parts of agate balls (diameter: 10 mm) for 20 hours. FIG. 12 shows the X-ray powder diffraction pattern of the chlorogallium phthalocyanine crystals obtained.

Figure 13:
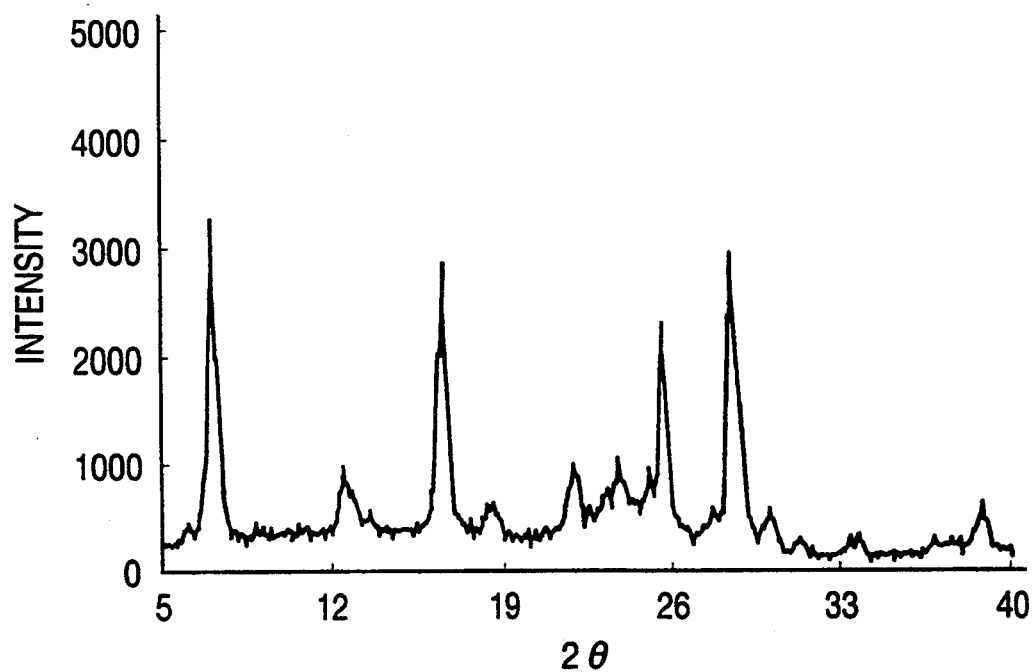
Figure 19:
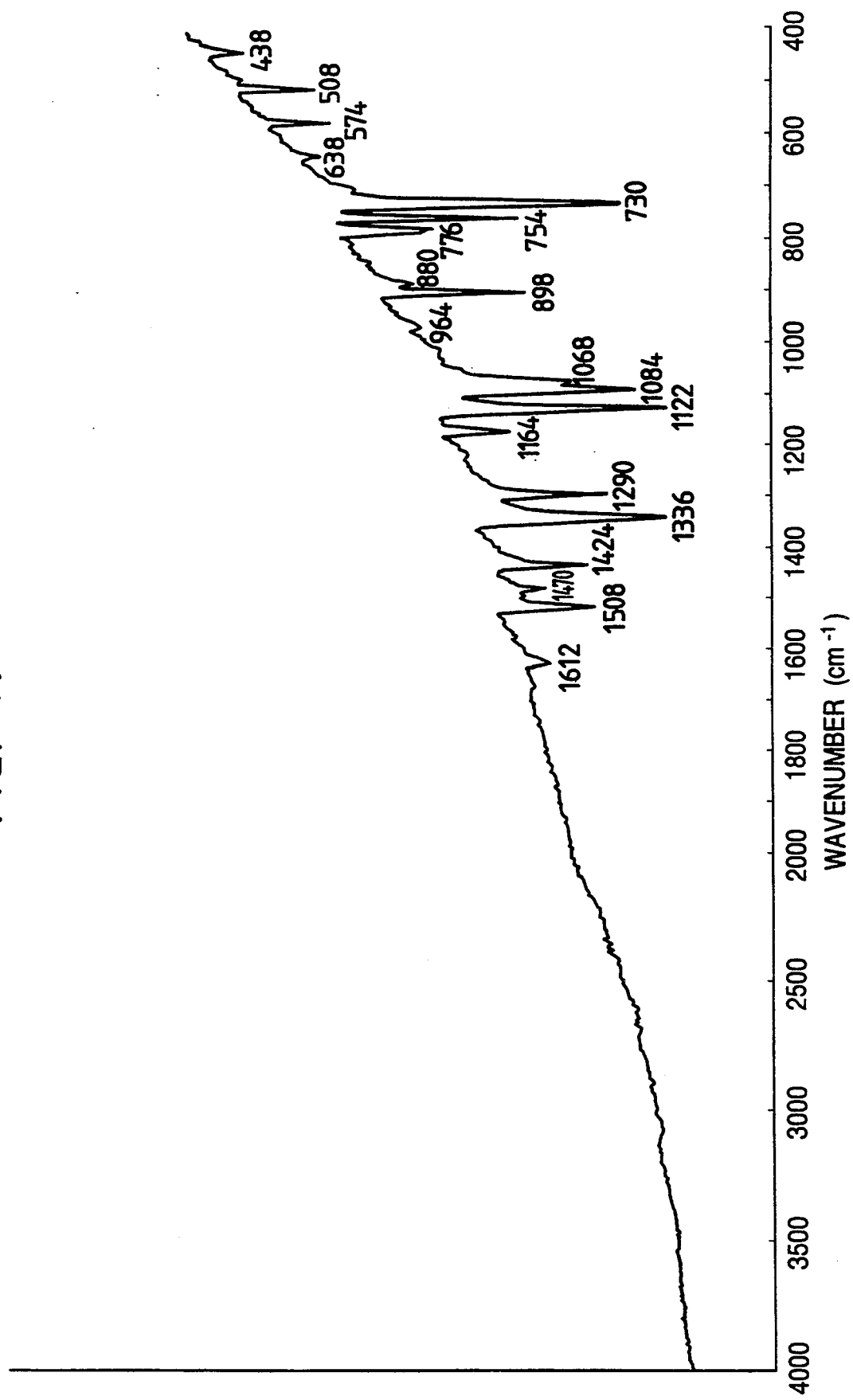
FIGS. 19 and 20 show the infrared absorption spectrum and the visible-near infrared absorption spectrum, respectively, of the chlorogallium phtholocyanine crystals obtained in Example 12.
Figure 20:
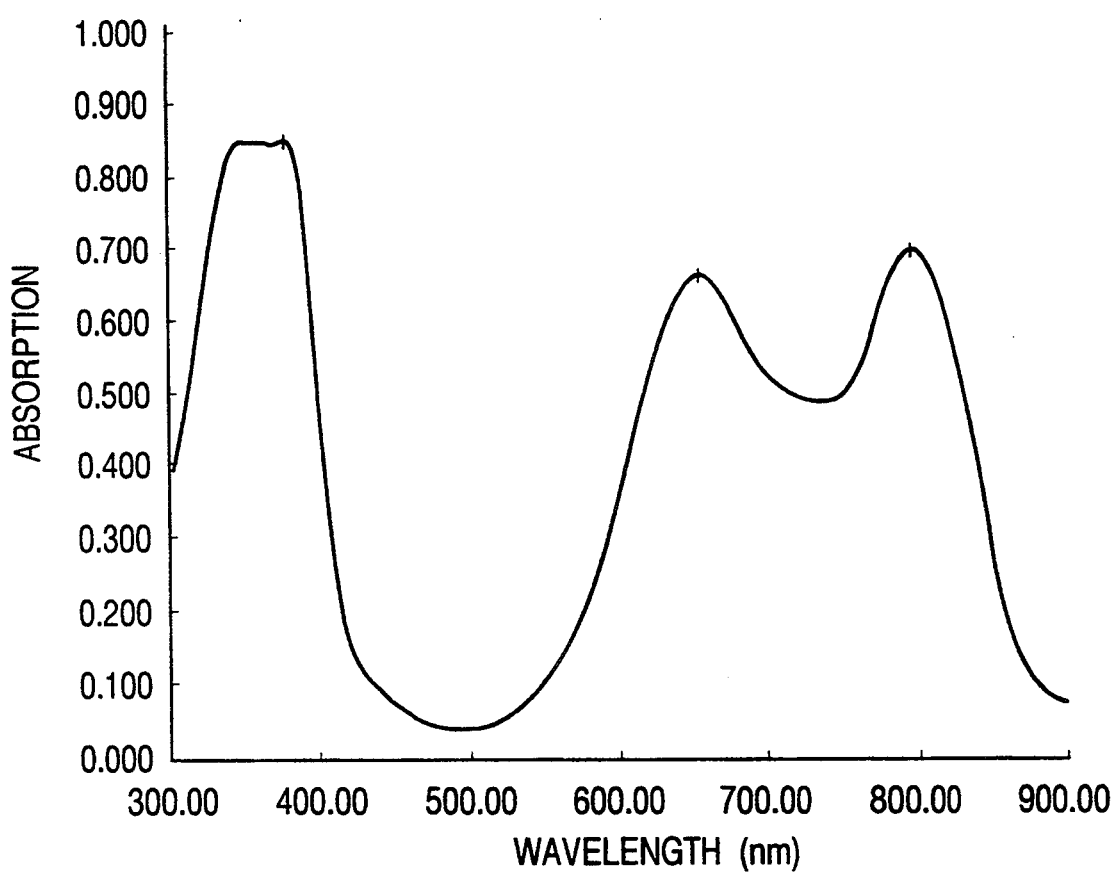

Next, 25 parts of the crystals were milled in a ball mill along with 300 parts of glass beads (diameter: 1 mm) and 400 parts of benzyl alcohol at room temperature for 12 hours. After filtered and washed with 500 parts of methanol, the wet cake obtained was dried under reduced pressure to obtain chlorogallium phthalocyanine crystals. The crystals thus obtained had an extremely uniform crystal form with a grain size of approximately from 0.05 to 0.15 μm. FIG. 13 shows the X-ray powder diffraction pattern of the crystals. FIG. 19 shows the infrared absorption spectrum of the crystals. FIG. 20 shows the visible near infrared absorption spectrum of the crystals.

EXAMPLE 13

Figure 14:
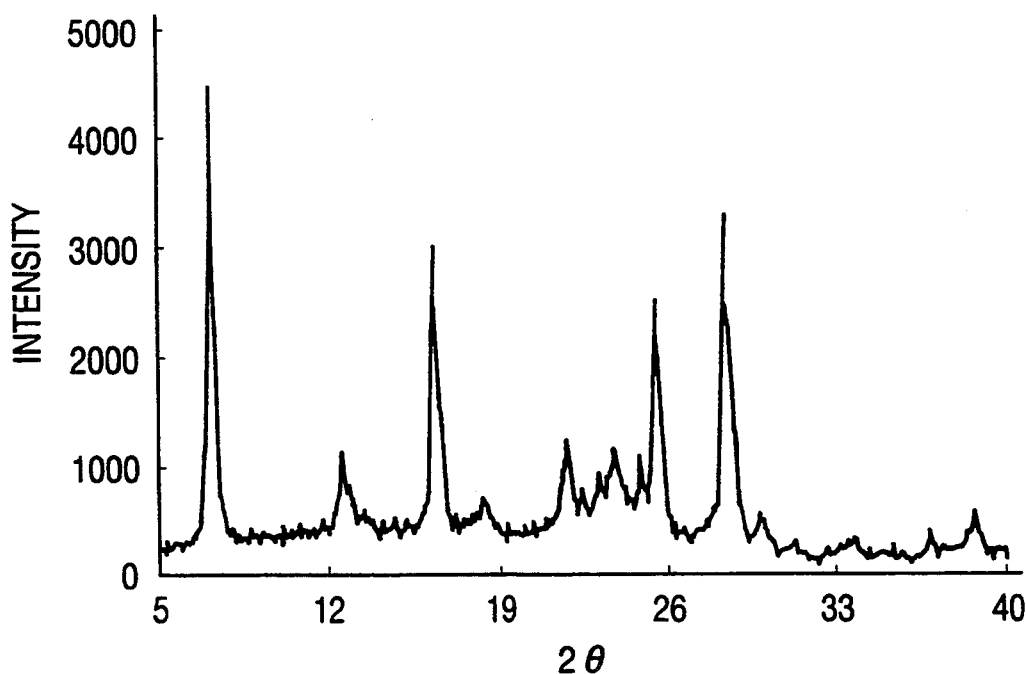
FIG. 14 shows the powder X-ray diffraction pattern of chlorogallium phtholocyanine crystals obtained in Example 13.

1.0 part of chlorogallium phthalocyanine as ground in the same manner as in Example 12 and 30 parts of benzyl alcohol were stirred in a 200-ml flask at 60° C. for 1.5 hours. The crystals were washed with 50 parts of methanol and dried under reduced pressure to obtain chlorogallium phthalocyanine crystals. The thus obtained crystals had an extremely uniform crystal form with a grain size of approximately from 0.05 to 0.15 μm. FIG. 14 shows the X-ray powder diffraction pattern of the crystals.

EXAMPLE 14

Figure 15:
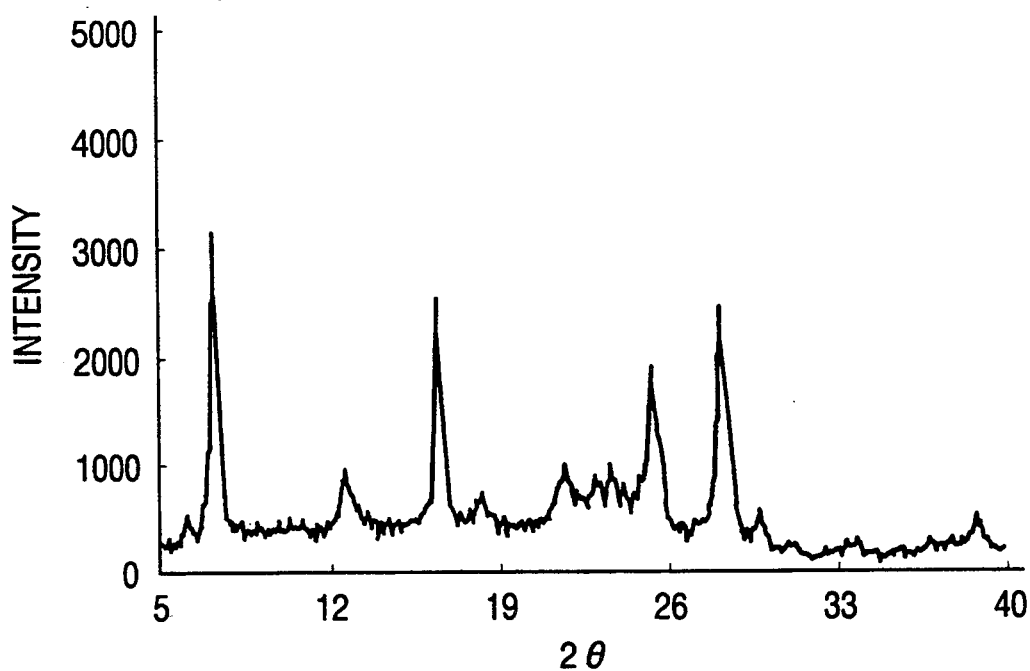
FIG. 15 shows the powder X-ray diffraction pattern of chlorogallium phtholocyanine crystals obtained in Example 14.

20 parts of chlorogallium phthalocyanine crystals as ground in the same manner as in Example 12 were milled in a ball mill along with 250 parts of glass beads (diameter: 1 mm) and 350 parts of m-tolylcarbinol at room temperature for 12 hours. After filtered and washed with 500 parts of methanol, the wet cake obtained was dried under reduced pressure to obtain chlorogallium phthalocyanine crystals. FIG. 15 shows the X-ray powder diffraction pattern of the thus obtained chlorogallium phthalocyanine crystals.

COMPARATIVE EXAMPLE 2

Figure 16:
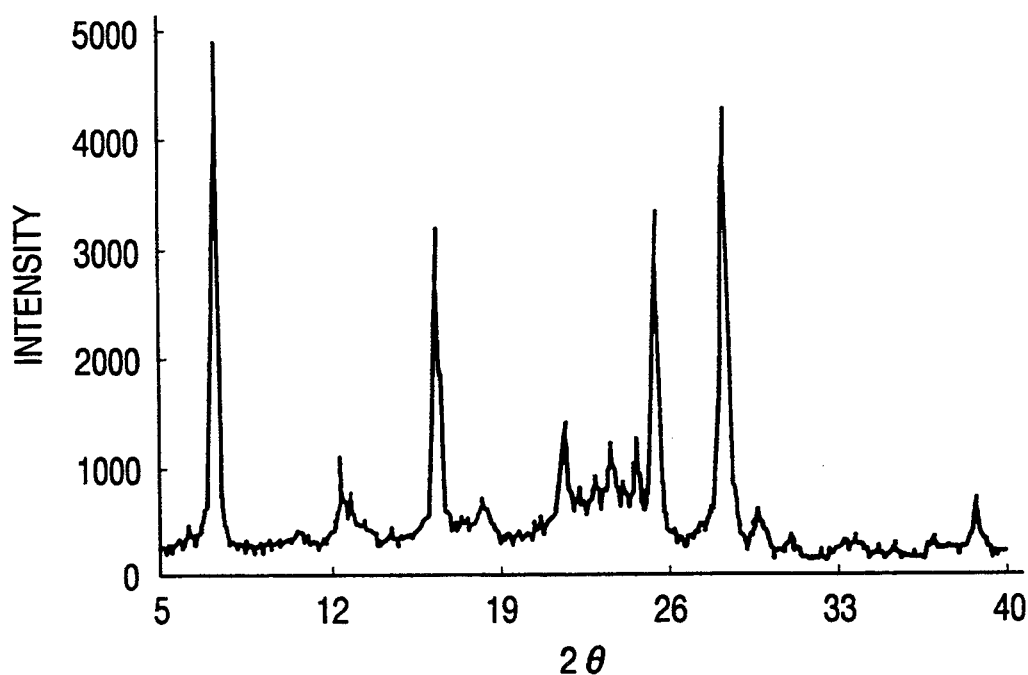
FIG. 16 shows the powder X-ray diffraction pattern of chlorogallium phtholocyanine crystals obtained in Comparative Example 2.

0.5 part of chlorogallium phthalocyanine crystals as ground in the same manner as in Example 12 were milled in a ball mill along with 60 parts of glass beads (diameter: 1 mm) and 20 parts of chlorobenzene at room temperature for 24 hours. After filtered and washed with 500 parts of methanol, the wet cake obtained was dried under reduced pressure to obtain chlorogallium phthalocyanine crystals. FIG. 16 shows the X-ray powder diffraction pattern of the thus obtained chlorogallium phthalocyanine crystals.

COMPARATIVE EXAMPLE 3

Figure 17:
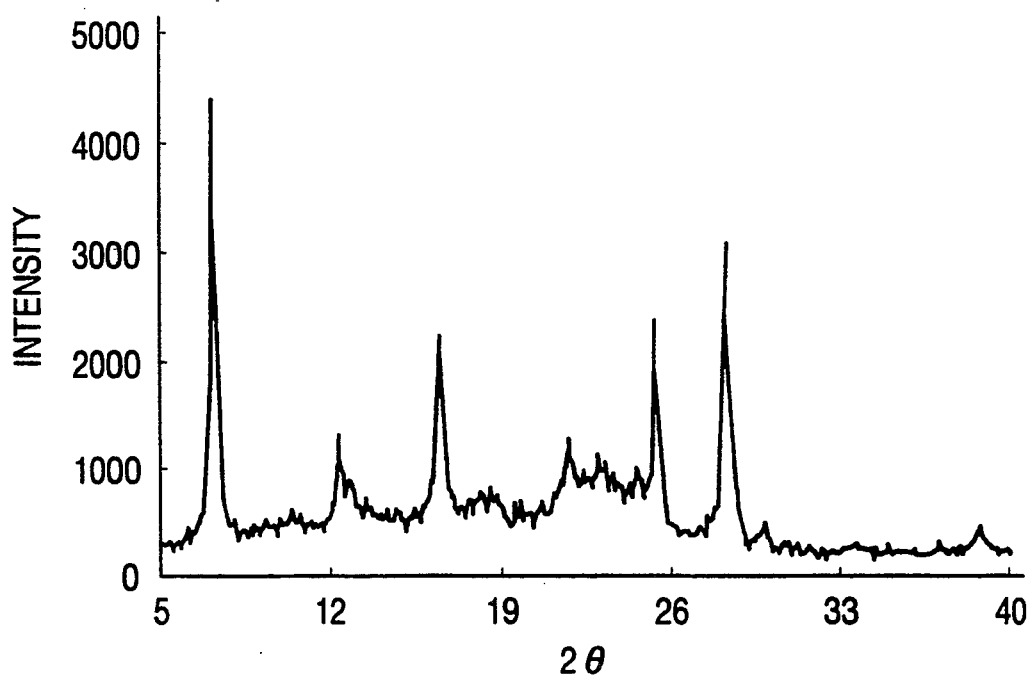
FIG. 17 shows the powder X-ray diffraction pattern of chlorogallium phtholocyanine crystals obtained in Comparative Example 2.

25 parts of chlorogallium phthalocyanine crystals as ground in the same manner as in Example 12 were milled in a ball mill along with 300 parts of glass beads (diameter: 1 mm) and 300 parts of dimethylformamide at room temperature for 24 hours. After filtered and washed with 500 parts of methanol, the wet cake obtained was dried under reduced pressure to obtain chlorogallium phthalocyanine crystals. FIG. 17 shows the X-ray powder diffraction pattern of the thus obtained chlorogallium phthalocyanine crystals.

COMPARATIVE EXAMPLE 4

Figure 18:
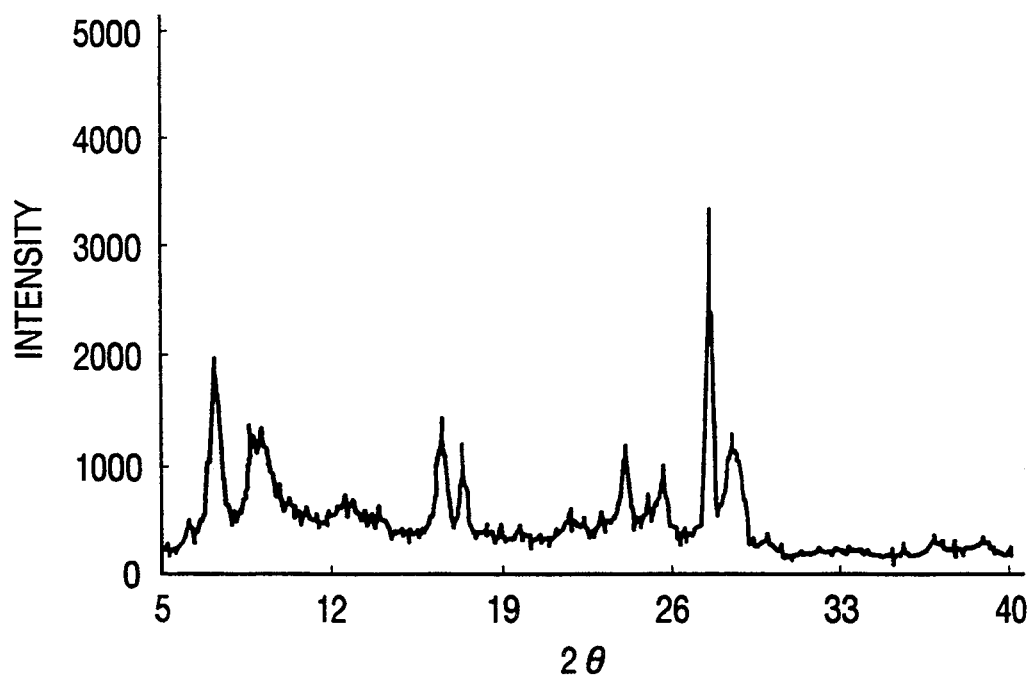
FIG. 18 shows the powder X-ray diffraction pattern of chlorogallium phtholocyanine crystals obtained in Comparative Example 2.

0.5 part of chlorogallium phthalocyanine crystals as ground in the same manner as in Example 12 were milled in a ball mill along with 60 parts of glass beads (diameter: 1 mm) and 20 parts of ethylene glycol at room temperature for 20 hours. After filtered and washed with 500 parts of methanol, the wet cake obtained was dried under reduced pressure to obtain chlorogallium phthalocyanine crystals. FIG. 18 shows the X-ray powder diffraction pattern of the thus obtained chlorogallium phthalocyanine crystals.

EXAMPLES 15 TO 17

Using each of the chlorogallium phthalocyanine crystals as obtained in Examples 12 to 14, electrophotographic photoreceptors were prepared in the same manner as in Example 6. The photoreceptors were evaluated in the same manner as in Example 6. The results obtained are shown in Table 2 below.

COMPARATIVE EXAMPLE 5

A comparative electrophotographic photoreceptor composed of a charge generating layer and a charge transporting layer was prepared in the same manner as in Example 6, except that the chlorogallium phthalocyanine crystals obtained in Comparative Example 2 were used. The photoreceptor thus prepared was evaluated in the same manner as in Example 6.

COMPARATIVE EXAMPLE 6

A comparative electrophotographic photoreceptor composed of a charge generating layer and a charge transporting layer was prepared in the same manner as in Example 6, except that the chlorogallium phthalocyanine crystals obtained in Comparative Example 3 were used. The photoreceptor thus prepared was evaluated in the same manner as in Example 6.

COMPARATIVE EXAMPLE 7

A comparative electrophotographic photoreceptor composed of a charge generating layer and a charge transporting layer was prepared in the same manner as in Example 6, except that the chlorogallium phthalocyanine crystals obtained in Comparative Example 4 were used. The photoreceptor thus prepared was evaluated in the same manner as in Example 6.

The results obtained in Comparative Examples 5 to 7 are shown in Table 2.

TABLE 2

| | Charge Generating Layer | | Initial Characteristics | | | | Retained Characterisitics (after 1000 repetitions) | | | |
|---|---|---|---|---|---|---|---|---|---|---|
| Example No. | Crystals Used | Solvent for Treatment | $V_0$ (V) | $E_{\frac{1}{2}}$ (erg/cm$^2$) | DDR (%) | $F_R$ (V) | $V_0$ (V) | $E_{\frac{1}{2}}$ (erg/cm$^2$) | DDR (%) | $F_R$ (V) |
| Example 15 | Example 12 | benzyl alcohol | −823 | 1.9 | 1.9 | 2.0 | −820 | 1.9 | 1.9 | 2.1 |
| Example 16 | Example 13 | benzyl alcohol | −812 | 2.0 | 1.9 | 2.0 | −810 | 2.0 | 1.9 | 2.1 |
| Example 17 | Example 14 | m-tolylcarbinol | −802 | 1.8 | 1.7 | 2.0 | −800 | 1.8 | 1.7 | 2.1 |
| Comparative Example 6 | Comparative Example 3 | chlorobenzene | −810 | 2.4 | 2.0 | 2.0 | −800 | 2.5 | 2.2 | 2.8 |
| Comparative Example 7 | Comparative Example 4 | ethylene glycol | −780 | 3.2 | 3.2 | 2.5 | −770 | 3.3 | 3.2 | 4.1 |

EXAMPLE 18

A solution of 1 part of an alcohol-soluble nylon resin (Lakamide L-5003, produced by Dai-Nippon Ink Co., Ltd.) in 10 parts of methanol was dip coated on an aluminum substrate and dried at 120° C. for 10 minutes to form a 0.5 μm thick subbing layer.

One part of the chlorogallium phthalocyanine crystal obtained in Example 2 was mixed with 1 part of a polyvinyl butyral resin ("S-Lec BM-S" produced by Sekisui Chemical Co., Ltd.) and 100 parts of n-butyl acetate, and the mixture was dispersed in a paint shaker together with glass beads for 1 hour. Analysis of the resulting coating composition by X-ray diffractiometry revealed that the chlorogallium phthalocyanine crystal therein has the same crystal form as that before dispersing. The coating composition was dip coated on the subbing layer and dried by heating at 100° C. for 10 minutes to form a 0.15 μm thick charge generating layer.

A charge transporting layer having a thickness of 20 μm was provided on the charge generating layer in the same manner as in Example 6.

The electrophotographic photoreceptor thus prepared was measured for the initial values of $V_0$, $E_{\frac{1}{2}}$ and $V_R$, and those after 1000 times charging-exposure cycles in the same manner as in Example 6. The results obtained are shown in Table 3 below with the results of the following Examples 19 to 24.

EXAMPLE 19

An electrophotographic photoreceptor was prepared in the same manner as in Example 18 except that a polyester resin (Vylon 200, produced by Toyobo Co.) was used instead of the polyvinyl butyral resin. The resulting photoreceptor was measured and evaluated in the same manner as in Example 18.

EXAMPLE 20

Chlorogallium phthalocyanine crystals were obtained in the same manner as in Example 2 except that tetrahydrofuran was used instead of the mixed solvent of water/monochlorobenzene. The chlorogallium phthalocyanine crystals exhibited the same powder X-ray diffraction pattern as FIG. 3.

A solution of 1 part of an alcohol-soluble nylon resin (CM-8000, produced by Toray Industries, Inc.) in 10 parts of methanol was dip coated on an aluminum substrate and dried at 110° C. for 10 minutes to form a 0.1 μm thick subbing layer.

One part of the chlorogallium phthalocyanine crystal obtained above was mixed with 1 part of a polyvinyl butyral partially acetoacetal resin ("S-Lec BX-L" produced by Sekisui Chemical Co., Ltd.) and 100 parts of cyclohexanone, and the mixture was dispersed in a paint shaker together with glass beads for 1 hour. Analysis of the resulting coating composition by X-ray diffractiometry revealed that the chlorogallium phthalocyanine crystal therein has the same crystal form as that before dispersing. The coating composition was dip coated on the subbing layer and dried by heating at 120° C. for 10 minutes to form a 0.2 μm thick charge generating layer.

A charge transporting layer having a thickness of 20 μm was provided on the charge generating layer in the same manner as in Example 18 except that 2 parts of N,N′-bis(p-ethylephenyl)-N,N′-bis(p-tolyl)-3,3′-dimethylbenzidine represented by formula (3):

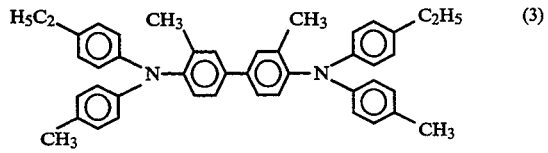

was used instead of N,N′-diphenyl-N,N′-bis(m-tolyl)-benzidine represented by formula (2).

The electrophotographic photoreceptor thus prepared was measured and evaluated in the same manner as in Example 6.

EXAMPLE 21

An electrophotographic photoreceptor was prepared in the same manner as in Example 20 except that 1 part of a polymethyl methacrylate resin (Elvacite 20, produced by Du Pont) was used instead of the polyvinyl butyral partially acetal resin.

The electrophotographic photoreceptor thus prepared was measured and evaluated in the same manner as in Example 20.

EXAMPLE 22

A solution consisting of 10 parts of a zirconium compound (Orgatics ZC 540, produced by Matsumoto Seiyaku Co., Ltd.), 1 part of a silane compound (A 1110, produced by Nippon Unicar Co., Ltd.), 40 parts of isopropanol, and 20 parts of butanol was dip coated on an aluminum substrate and dried at 160° C. for 10 minutes to form a 0.1 μm thick subbing layer.

One part of the chlorogallium phthalocyanine crystal obtained in Example 20 was mixed with 1 part of a carboxyl-modified vinyl chloride-vinyl acetate copolymer resin (VMCH, produced by Union Carbide) and 100 parts of n-butyl acetate, and the mixture was dispersed in a paint shaker together with glass beads for 1 hour. Analysis of the resulting coating composition by X-ray diffractiometry revealed that the chlorogallium phthalocyanine crystal therein has the same crystal form as that before dispersing. The coating composition was dip coated on the subbing layer and dried by heating at 100° C. for 10 minutes to form a 0.2 μm thick charge generating layer.

A charge transporting layer having a thickness of 20 μm was provided on the charge generating layer in the same manner as in Example 20.

The electrophotographic photoreceptor thus prepared was measured and evaluated in the same manner as in Example 20.

EXAMPLE 23

An electrophotographic photoreceptor was prepared in the same manner as in Example 22 except that 1 part of a phenoxy resin (PKHH, produced by Union Carbide) and 100 parts of cyclohexanone instead of the carboxyl-modified vinyl chloride-vinyl acetate copolymer resin and n-butyl acetate, respectively.

The electrophotographic photoreceptor thus prepared was measured and evaluated in the same manner as in Example 22.

EXAMPLE 24

An electrophotographic photoreceptor was prepared in the same manner as in Example 22 except that 1 part of a modified ether polyester resin (STAFIX NL, produced by Fuji Photo Film Co., Ltd.) and 100 parts of cyclohexanone instead of the carboxyl-modified vinyl chloride-vinyl acetate copolymer resin and n-butyl acetate, respectively.

The electrophotographic photoreceptor thus prepared was measured and evaluated in the same manner as in Example 22.

TABLE 3

| | Charge Generating Layer | | Electrophotographic Characteristics | | | | | |
|---|---|---|---|---|---|---|---|---|
| | | | 1st Operation | | | 1,000th Operation | | |
| Example No. | Crystal Used | Binder Resin | $V_0$ (V) | $E_{\frac{1}{2}}$ (erg/cm$^2$) | $V_R$ (V) | $V_0$ (V) | $E_{\frac{1}{2}}$ (erg/cm$^2$) | $V_R$ (V) |
| Example 18 | Example 2 | polyvinyl butyral | −823 | 2.1 | −17 | −811 | 2.2 | −21 |
| Example 19 | Example 2 | polyester | −755 | 3.0 | −36 | −720 | 3.5 | −48 |
| Example 20 | Example 20 | partially acetoacetal-modified polyvinyl butyral | −812 | 2.3 | −22 | −806 | 2.5 | −25 |
| Example 21 | Example 20 | polymethyl methacrylate | −763 | 3.2 | −45 | −726 | 3.7 | −42 |

TABLE 3-continued

| | Charge Generating Layer | | Electrophotographic Characteristics | | | | | |
|---|---|---|---|---|---|---|---|---|
| | | | 1st Operation | | | 1,000th Operation | | |
| Example No. | Crystal Used | Binder Resin | $V_0$ (V) | $E_{\frac{1}{2}}$ (erg/cm$^2$) | $V_R$ (V) | $V_0$ (V) | $E_{\frac{1}{2}}$ (erg/cm$^2$) | $V_R$ (V) |
| Example 22 | Example 20 | carboxyl-modified vinyl chloride-vinyl acetate copolymer | −802 | 1.9 | −28 | −797 | 2.0 | −26 |
| Example 23 | Example 20 | phenoxy | −805 | 2.0 | −21 | −798 | 2.2 | −26 |
| Example 24 | Example 20 | modified ether polyester | −811 | 1.9 | −25 | −803 | 2.0 | −31 |

EXAMPLES 25 TO 29

Drum photoreceptors were produced under the same conditions as in Examples 18, 20, and 22 to 24, respectively, and were each loaded into a semiconductor laser printer (FX XP-15, manufactured by Fuji Xerox Co., Ltd.). Copying test was carried on 10,000 times, and it was found that the film properties of the charge generating layer was satisfactory and an image defect was not observed in any photoreceptor in the first copy and 10,000th copy.

EXAMPLE 30

A solution consisting of 10 parts of a zirconium compound (Orgatics ZC 540, produced by Matsumoto Seiyaku Co., Ltd.), 1 part of a silane compound (A 1110, produced by Nippon Unicar Co., Ltd.), 40 parts of isopropanol, and 20 parts of butanol was dip coated on an aluminum substrate and dried at 150° C. for 10 minutes to form a 0.5 μm thick subbing layer.

One part of the chlorogallium phthalocyanine crystal obtained in Example 2 was mixed with 1 part of a polyvinyl butyral resin ("S-Lec BM-S" produced by Sekisui Chemical Co., Ltd.) and 100 parts of n-butyl acetate, and the mixture was dispersed in a paint shaker together with glass beads for 1 hour. Analysis of the resulting coating composition by X-ray diffractometry revealed that the chlorogallium phthalocyanine crystal therein has the same crystal form as that before dispersing. The coating composition was dip coated on the subbing layer and dried by heating at 100° C. for 10 minutes to form a 0.15 μm thick charge generating layer.

In 20 parts of chlorobenzene were dissolved 2 parts of Compound No. 3 in Table A above and 3 parts of poly(1,1-di(p-phenylene)cyclohexanecarbonate) represented by formula (2), and the resulting coating composition was coated on the charge generating layer by dip coating and dried by heating at 120° C. for 1 hour to form a 20 μm thick charge transporting layer.

The electrophotographic photoreceptor thus prepared was measured for the initial values of $V_0$, $E_{\frac{1}{2}}$ and $V_R$, and those after 1000 times charging-exposure cycles in the same manner as in Example 6. The results obtained are shown in Table 4 below with the results of the following Examples 31 to 39.

EXAMPLE 31 TO 39

Electrophotographic photoreceptors were prepared in the same manner as in Example 30, except for using charge transporting materials shown in Table 4. The resulting photoreceptors were evaluated in the same manner as in Example 30.

TABLE 4

| Example No. | Charge transporting material* | 1st operation | | | 100th operation | | | Stability | | |
|---|---|---|---|---|---|---|---|---|---|---|
| | | $V_0$ (V) | $E_{\frac{1}{2}}$ (erg/cm$^2$) | $V_R$ (V) | $V_0$ (V) | $E_{\frac{1}{2}}$ (erg/cm$^2$) | $V_R$ (V) | $\Delta V_0$ (V) | $\Delta E_{\frac{1}{2}}$ (erg/cm$^2$) | $\Delta V_R$ (V) |
| 30 | 3 | −823 | 2.1 | −1.7 | −817 | 2.2 | −2.1 | 6 | 0.1 | 0.4 |
| 31 | 7 | −812 | 2.3 | −2.2 | −806 | 2.5 | −2.5 | 6 | 0.2 | 0.3 |
| 32 | 9 | −815 | 2.3 | −2.2 | −808 | 2.5 | −2.5 | 7 | 0.2 | 0.3 |
| 33 | 15 | −802 | 1.9 | −2.8 | −797 | 2.0 | −3.0 | 5 | 0.1 | 0.2 |
| 34 | 20 | −810 | 2.3 | −2.2 | −802 | 2.5 | −2.5 | 8 | 0.2 | 0.3 |
| 35 | 22 | −802 | 1.9 | −2.6 | −794 | 2.0 | −2.8 | 8 | 0.1 | 0.2 |
| 36 | 29 | −823 | 2.7 | −6.1 | −816 | 2.9 | −7.0 | 7 | 0.2 | 0.9 |
| 37 | 41 | −805 | 2.0 | −2.6 | −795 | 2.3 | −3.0 | 10 | 0.3 | 0.4 |
| 38 | 46 | −785 | 2.6 | −2.8 | −775 | 2.8 | −4.0 | 10 | 0.2 | 1.2 |
| 39 | 50 | −802 | 1.9 | −2.8 | −797 | 2.0 | −3.1 | 5 | 0.1 | 0.3 |

Note:
*Compound number in Table A above

As has been explained in detail in the above, the chlorogallium phthalocyanine crystals of the present invention have novel crystal forms and the wavelength range of the light, to which they are sensitive, is extended to a long wavelength range. Therefore, they are extremely useful as photoconductive materials for electrophotographic photoreceptors such as printers of using semiconductor lasers. The electrophotographic photoreceptors of the present invention composed of the above-mentioned chlorogallium phthalocyanine crystals with a novel crystal form have high sensitivity and are usable as high-durability photoreceptors, since the residual charge is low, the charging property is high and the fluctuation of the characteristics due to repeated use is small.

In accordance with the present invention, novel crystals of chlorogallium phthalocyanine having distinct diffraction peaks at particular Bragg angles in an X-ray diffraction spectrum can be obtained by a simple method of mechanically grinding an ordinary chlorogallium phthalocyanine followed by treating it with an aromatic alcohol.

While the invention has been described in detail and with reference to specific embodiments thereof, it will be apparent to one skilled in the art that various changes and modifications can be made therein without departing from the spirit and scope thereof.

What is claimed is:

1. Chlorogallium phthalocyanine crystals having distinct diffraction peaks at 7.4°, 16.6°, 25.5° and 28.3° of the Bragg angle (2θ±0.2) to a CuKα characteristic X-ray.

2. A photoconductive material for electrophotographic photoreceptor comprising chlorogallium phthalocyanine crystals having distinct diffraction peaks at 7.4°, 16.6°, 25.5° and 28.3° of the Bragg angle (2θ±0.2) to a CuKα characteristic X-ray.

3. An electrophotographic photoreceptor comprising an electroconductive support having thereon a light-sensitive layer containing chlorogallium phthalocyanine crystals having distinct diffraction peaks at 7.4°, 16.6°, 25.5° and 28.3° of the Bragg angle (2θ±0.2) to a CuKα characteristic X-ray.

4. An electrophotographic photoreceptor as claimed in claim 3, wherein said light-sensitive layer further contains at least one binder resin selected from the group consisting of a polyvinyl acetal resin, a vinyl chloride-vinyl acetate copolymer resin, a phenoxy resin, and a modified ether polyester resin.

5. An electrophotographic photoreceptor as claimed in claim 4, wherein said polyvinyl acetal resin is at least one selected from the group consisting of a polyvinyl butyral resin, a polyvinyl formal resin, and a partially acetal-modified polyvinyl butyral resin.

6. An electrophotographic photoreceptor as claimed in claim 4, wherein said vinyl chloride-vinyl acetate copolymer resin is at least one selected from a vinyl chloride-vinyl acetate copolymer, a hydroxy-modified vinyl chloride-vinyl acetate copolymer, and a carboxyl-modified vinyl chloride-vinyl acetate copolymer.

7. An electrophotographic photoreceptor as claimed in claim 4, wherein said light-sensitive layer comprises a charge generating layer having thereon a charge transporting layer, said charge generating layer containing said chlorogallium phthalocyanine crystals and said binder resin.

8. Chlorogallium phthalocyanine crystals having distinct diffraction peaks at 6.8°, 17.3°, 23.6° and 26.9° of the Bragg angle (2θ±0.2) to a CuKα characteristic X-ray.

9. A photoconductive material for electrophotographic photoreceptor comprising chlorogallium phthalocyanine crystals having distinct diffraction peaks at 6.8°, 17.3°, 23.6° and 26.9° of the Bragg angle (2θ±0.2) to a CuKα characteristic X-ray.

10. An electrophotographic photoreceptor comprising an electroconductive support having thereon a light-sensitive layer containing chlorogallium phthalocyanine crystals having distinct diffraction peaks at 6.8°, 17.3°, 23.6° and 26.9° of the Bragg angle (2θ±0.2) to a CuKα characteristic X-ray.

11. An electrophotographic photoreceptor as claimed in claim 10, wherein said light-sensitive layer further contains at least one binder resin selected from the group consisting of a polyvinyl acetal resin, a vinyl chloride-vinyl acetate copolymer resin, a phenoxy resin, and a modified ether polyester resin.

12. An electrophotographic photoreceptor as claimed in claim 11, wherein said polyvinyl acetal resin is at least one selected from the group consisting of a polyvinyl butyral resin, a polyvinyl formal resin, and a partially acetal-modified polyvinyl butyral resin.

13. An electrophotographic photoreceptor as claimed in claim 11, wherein said vinyl chloride-vinyl acetate copolymer resin is at least one selected from a vinyl chloride-vinyl acetate copolymer, a hydroxy-modified vinyl chloride-vinyl acetate copolymer, and a carboxyl-modified vinyl chloride-vinyl acetate copolymer.

14. An electrophotographic photoreceptor as claimed in claim 11, wherein said light-sensitive layer comprises a charge generating layer having thereon a charge transporting layer, said charge generating layer containing said chlorogallium phthalocyanine crystals and said binder resin.

15. Chlorogallium phthalocyanine crystals having distinct diffraction peaks at 8.7° to 9.2°, 17.6°, 24.0°, 27.4° and 28.8° of the Bragg angle (2θ±0.2) to a CuKα characteristic X-ray.

16. A photoconductive material for electrophotographic photoreceptor comprising chlorogallium phthalocyanine crystals having distinct diffraction peaks at 8.7° to 9.2°, 17.6°, 24.0°, 27.4° and 28.8° of the Bragg angle (2θ±0.2) to a CuKα characteristic X-ray.

17. An electrophotographic photoreceptor comprising an electroconductive support having thereon a light-sensitive layer containing chlorogallium phthalocyanine crystals having distinct diffraction peaks at 8.7° to 9.2°, 17.6°, 24.0°, 27.4° and 28.8° of the Bragg angle (2θ±0.2) to a CuKα characteristic X-ray.

18. An electrophotographic photoreceptor as claimed in claim 17, wherein said light-sensitive layer further contains at least one binder resin selected from the group consisting of a polyvinyl acetal resin, a vinyl chloride-vinyl acetate copolymer resin, a phenoxy resin, and a modified ether polyester resin.

19. An electrophotographic photoreceptor as claimed in claim 17, wherein said polyvinyl acetal resin is at least one selected from the group consisting of a polyvinyl butyral resin, a polyvinyl formal resin, and a partially acetal-modified polyvinyl butyral resin.

20. An electrophotographic photoreceptor as claimed in claim 17, wherein said vinyl chloride-vinyl acetate copolymer resin is at least one selected from a vinyl chloride-vinyl acetate copolymer, a hydroxy-modified vinyl chloride-vinyl acetate copolymer, and a carboxyl-modified vinyl chloride-vinyl acetate copolymer.

21. An electrophotographic photoreceptor as claimed in claim 17, wherein said light-sensitive layer comprises a charge generating layer having thereon a charge transporting layer, said charge generating layer containing said chlorogallium phthalocyanine crystals and said binder resin.

22. A method of preparing chlorogallium phthalocyanine crystals having distinct diffraction peaks according to the method of claim 32, wherein said crystals have distinct diffraction peaks at at least 7.4°, 16.6°, 25.5° and 28.3° of the Bragg angle (2θ±0.2) in an X-ray diffraction spectrum, said method comprising mechanically grinding and treating chlorogallium phthalocyanine with an aromatic alcohol.

23. An electrophotographic photoreceptor as claimed in claim 7, wherein said charge transporting layer comprises a benzidine compound represented by formula (I)

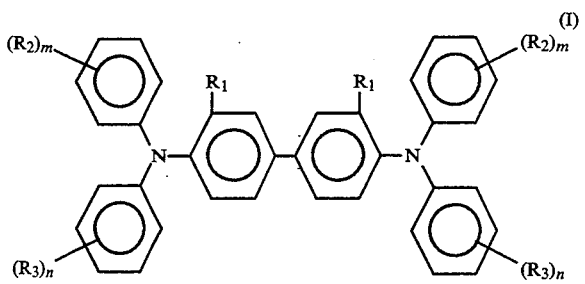

wherein $R_1$ represents a hydrogen atom, an alkyl group, an alkoxy group, or a halogen atom, two groups represented by $R_1$ may be the same or different; $R_2$ and $R_3$ represent a hydrogen atom, an alkyl group, an alkoxy group, a halogen atom, or a substituted amino group, two groups represented by $R_2$ may be the same or different, two groups represented by $R_3$ may be the same or different; and m and n, which may be the same or different, each represents an integer of from 0 to 2.

24. An electrophotographic photoreceptor as claimed in claim 7, wherein said charge transporting layer comprises a benzidine compound represented by formula (II)

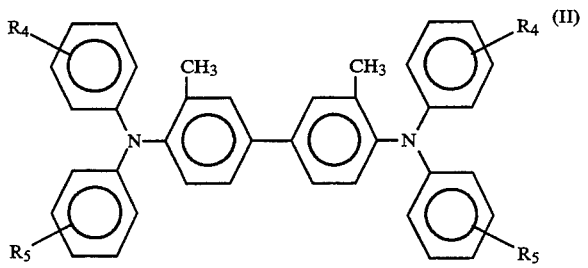

wherein $R_4$ and $R_4$, which may be the same or different, each represents a hydrogen atom or a methyl group, two groups represented by $R_4$ may be the same or different, and two groups represented by $R_5$ may be the same or different.

25. An electrophotographic photoreceptor as claimed in claim 7, wherein said charge transporting layer comprises a benzidine compound represented by formula (III)

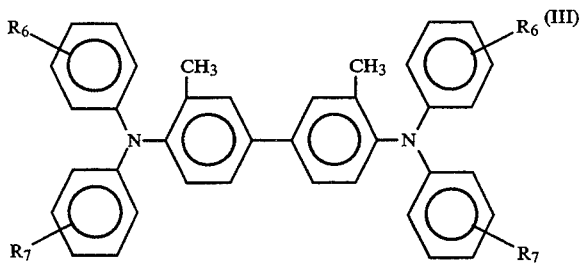

wherein one of $R_6$ and $R_7$ represents an alkyl group having two or more carbon atoms; the other represents a hydrogen atom, an alkyl group, an alkoxy group, or a substituted alkyl group; two groups represented by $R_6$ may be the same or different; and two groups represented by $R_7$ may be the same or different.

26. An electrophotographic photoreceptor as claimed in claim 14, wherein said charge transporting layer comprises a benzidine compound represented by formula (I)

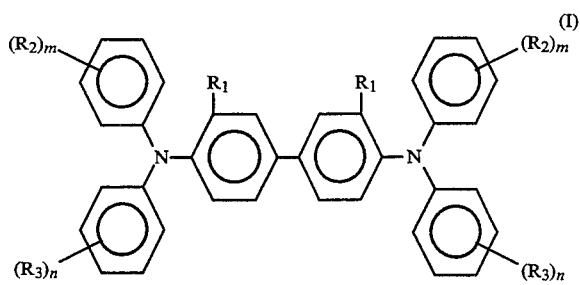

wherein $R_1$ represents a hydrogen atom, an alkyl group, an alkoxy group, or a halogen atom, two groups represented by $R_1$ may be the same or different; $R_2$ and $R_3$ represent a hydrogen atom, an alkyl group, an alkoxy group, a halogen atom, or a substituted amino group, two groups represented by $R_2$ may be the same or different, two groups represented by $R_3$ may be the same or different; and m a nd n, which may be the same or different, each represents an integer of from 0 to 2.

27. An electrophotographic photoreceptor as claimed in claim 14, wherein said charge transporting layer comprises a benzidine compound represented by formula (II)

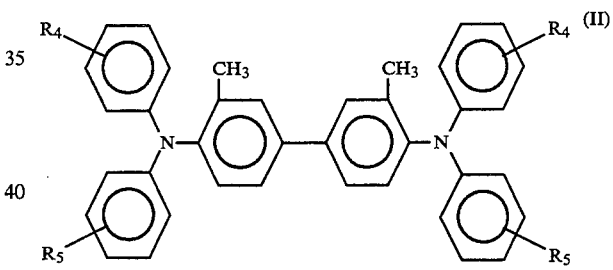

wherein $R_4$ and $R_4$, which may be the same or different, each represents a hydrogen atom or a methyl group, two groups represented by $R_4$ may be the same or different, and two groups represented by $R_5$ may be the same or different.

28. An electrophotographic photoreceptor as claimed in claim 14, wherein said charge transporting layer comprises a benzidine compound represented by formula (III)

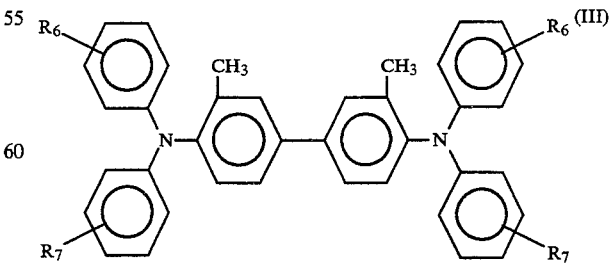

wherein one of $R_6$ and $R_7$ represents an alkyl group having two or more carbon atoms; the other represents a hydrogen atom, an alkyl group, an alkoxy group, or a substituted alkyl group; two groups represented by R₆ may be the same or different; and two groups represented by R₇ may be the same or different.

29. An electrophotographic photoreceptor as claimed in claim 21, wherein said charge transporting layer comprises a benzidine compound represented by formula (I)

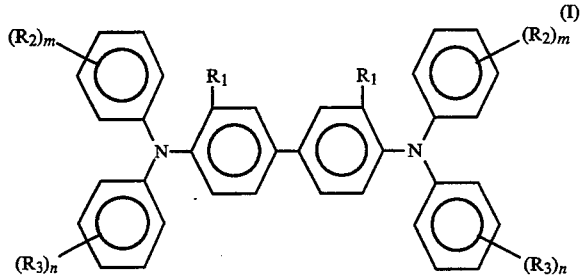

wherein $R_1$ represents a hydrogen atom, an alkyl group, an alkoxy group, or a halogen atom, two groups represented by $R_1$ may be the same or different; $R_2$ and $R_3$ represent a hydrogen atom, an alkyl group, an alkoxy group, a halogen atom, or a substituted amino group, two groups represented by $R_2$ may be the same or different, two groups represented by $R_3$ may be the same or different; and m and n, which may be the same or different, each represents an integer of from 0 to 2.

30. An electrophotographic photoreceptor as claimed in claim 21, wherein said charge transporting layer comprises a benzidine compound represented by formula (II)

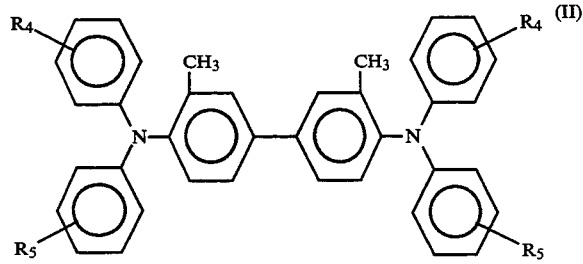

wherein $R_4$ and $R_4$, which may be the same or different, each represents a hydrogen atom or a methyl group, two groups represented by $R_4$ may be the same or different, and two groups represented by $R_5$ may be the same or different.

31. An electrophotographic photoreceptor as claimed in claim 21, wherein said charge transporting layer comprises a benzidine compound represented by formula (III)

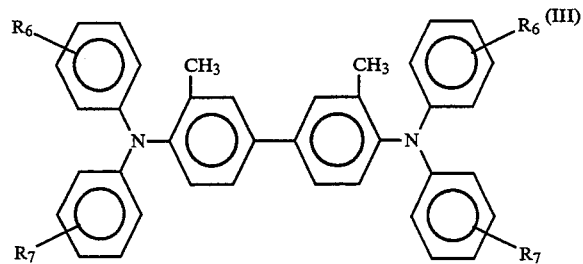

wherein one of $R_6$ and $R_7$ represents an alkyl group having two or more carbon atoms; the other represents a hydrogen atom, an alkyl group, an alkoxy group, or a substituted alkyl group; two groups represented by $R_6$ may be the same or different; and two groups represented by $R_7$ may be the same or different.

32. A method of preparing chlorogallium phthalocyanine crystals having distinct diffraction peaks of the Bragg angle (2θ±0.2) in an X-ray diffraction spectrum, said method comprising mechanically grinding and treating chlorogallium phthalocyanine with an organic solvent.

33. A method of preparing chlorogallium phthalocyanine crystals having distinct diffraction peaks according to the method of claim 32, wherein said crystals have distinct diffraction peaks at at least 6.8°, 17.3°, 23.6° and 26.9° of the Bragg angle (2θ±0.2) in an X-ray diffraction spectrum, said method comprising mechanically grinding and treating chlorogallium phthalocyanine with methylene chloride.

34. A method of preparing chlorogallium phthalocyanine crystals having distinct diffraction peaks according to the method of claim 32, wherein said crystals have distinct diffraction peaks at at least 8.7°–9.2°, 17.6°, 24.0°, 27.4° and 28.8° of the Bragg angle (2θ±0.2) in an X-ray diffraction spectrum, said method comprising mechanically grinding and treating chlorogallium phthalocyanine with a lower alcohol.

* * * * *